(12) United States Patent
Aktas et al.

(10) Patent No.: US 10,899,250 B2
(45) Date of Patent: Jan. 26, 2021

(54) SEATING ASSEMBLY

(71) Applicant: Ford Global Technologies, LLC, Dearborn, MI (US)

(72) Inventors: Macit Aktas, Windsor (CA); Kurt Leon Kormos, Milford, MI (US); Joseph Michael Kish, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 154 days.

(21) Appl. No.: 16/245,798

(22) Filed: Jan. 11, 2019

(65) Prior Publication Data
US 2020/0223327 A1    Jul. 16, 2020

(51) Int. Cl.
*B60N 2/02*  (2006.01)
*B60N 2/14*  (2006.01)
*B60N 2/30*  (2006.01)
*B60N 2/225* (2006.01)
*B60N 2/22*  (2006.01)

(52) U.S. Cl.
CPC ............. *B60N 2/14* (2013.01); *B60N 2/3009* (2013.01); *B60N 2/2209* (2013.01); *B60N 2/2252* (2013.01)

(58) Field of Classification Search
None
See application file for complete search history.

(56) References Cited

U.S. PATENT DOCUMENTS

| | | | |
|---|---|---|---|
| 3,981,473 A | 9/1976 | Nagai | |
| 4,101,169 A | 7/1978 | Muraishi et al. | |
| 4,756,577 A | 7/1988 | Berg et al. | |
| 5,695,247 A | 12/1997 | Premji | |
| 6,123,380 A * | 9/2000 | Sturt | B60N 2/3011 296/65.09 |
| 6,152,533 A | 11/2000 | Smuk | |
| 6,439,531 B1 * | 8/2002 | Severini | B60N 2/0705 248/423 |
| 6,513,868 B1 | 2/2003 | Tame | |
| 7,152,923 B2 | 12/2006 | Charras et al. | |
| 7,562,926 B2 * | 7/2009 | Kojima | B60N 2/123 296/65.09 |
| 8,424,969 B2 | 4/2013 | Kammerer | |
| 8,801,101 B2 * | 8/2014 | Dagcioglu | B60N 2/3022 297/331 |
| 9,649,956 B2 | 5/2017 | Lehmann et al. | |
| 2010/0052390 A1 * | 3/2010 | Dagcioglu | B60N 2/3031 297/324 |
| 2010/0289313 A1 * | 11/2010 | Moegling | B60N 2/309 297/332 |
| 2013/0292982 A1 * | 11/2013 | Radermacher | B60N 2/20 297/318 |

* cited by examiner

*Primary Examiner* — Shin H Kim
(74) *Attorney, Agent, or Firm* — David L. Coppiellie; Price Heneveld LLP

(57) ABSTRACT

A seating assembly is provided that includes a seatback movable into a pitched position along a track. A first cam is engageable with a release lever of the track. A second cam is engageable with a bypass cam that is raised over a stop as the seatback moves to the pitched position. An intermediate lock is engageable with a pin positioned on a middle support arm of the seat base when the seatback is in the pitched position.

19 Claims, 20 Drawing Sheets

SEATING ASSEMBLY

FIELD OF THE DISCLOSURE

The present disclosure generally relates to a seating assembly, and more particularly to a seating assembly for a vehicle.

BACKGROUND OF THE DISCLOSURE

Vehicle seats often need to be moved forward in a vehicle, particularly when access to rear seating is only available by entering behind a front seating assembly. The front seating assembly may be moved forward directly or at an angle to facilitate entry.

SUMMARY OF THE DISCLOSURE

According to one aspect of the present disclosure, a seating assembly is provided that includes a seatback coupled to a seat base. The seatback is movable between a design position and a pitched position. The seating assembly further includes a track assembly having a stop with a first height and a ramp configured to support a trigger cam when the seatback is in the design position. A cross-member is rotatable into an engaged position. The cross-member has a first portion and a second portion. A first cam is positioned on the first portion, and a second cam is positioned on the second portion. A track release lever is engageable with a release button when the track release lever is depressed by the first cam when the first cam is in the engaged position. A bypass cam is movable into a raised position by the second cam when the second cam is in the engaged position. A first end of the bypass cam is positioned at a second height in the raised position. The second height is greater than the first height of the stop. An intermediate lock has a first notch and a second notch. A pin positioned on a support arm is selectively engageable with one of the first notch and the second notch when the seatback is in the pitched position.

Embodiments of the first aspect of the disclosure can include any one or a combination of the following features:
- the intermediate lock is rotatable between a first position and a second position, and the pin is received by the first notch when the intermediate lock is in the first position and the pin is received by the second notch when the intermediate lock is in the second position;
- the trigger cam is operably coupled to the intermediate lock by a cable, and the intermediate lock is in the first position when the trigger cam is supported on the ramp and in the second position when the trigger cam is removed from the ramp; and/or
- the intermediate lock is biased in the second position by a clock spring, and further wherein tension on the cable biases the lock in the first position against the clock spring bias.

According to another aspect of the present disclosure, a seating assembly is provided that includes a seatback coupled to a seat base. The seat base and the seatback are movable between a first and second position by way of first, second, and third support arms and a track assembly. An actuator is positioned on the seatback and operably coupled to a latch assembly positioned on the first support arm. A first cam and a second cam are positioned on a cross-member and are rotatable into an engaged position. The cross-member is coupled to and rotatable with the second support arm. A track release lever is engageable with a release button of the track assembly when the first cam is in the engaged position. A bypass cam is rotated into a raised position by the second cam when the second cam is in the engaged position. An intermediate lock defines a first notch and a second notch. A stop of the second arm is selectively engageable with one of the first and second notches.

Embodiments of the first aspect of the disclosure can include any one or a combination of the following features:
- the first portion of the cross-member includes a linear edge, and further wherein the first portion of the cross-member is positioned over a pin rotatably coupled to the second support arm and shaped to complement the cross-member;
- the seating assembly further includes a bracket positioned on the track assembly and having an outer wall, the outer wall defining an aperture to at least partially receive the pin, and a first clock spring positioned to bias the cross-member and the support arm into a disengaged position, wherein the first clock spring is positioned on a first side of the outer wall and the second support arm and the cross-member are positioned on a second side of the outer wall;
- the seating assembly further includes a stop is positioned on the track assembly, wherein the stop has a first height and is configured to abut the bypass cam when the seat base and seatback are in the first position;
- the bypass cam is rotatable between the raised position and a lowered position, and further wherein a first end of the bypass cam is depressed by the second cam when the second cam is in the engaged position; and/or
- a second end of the bypass cam is raised to a second height when the bypass cam is in the raised position, the second height being greater than the first height of the stop, and further wherein a second clock spring biases the bypass cam into the lowered position.

According to another aspect of the present disclosure, a seating assembly is provided that includes a seatback movable into a pitched position along a track. A first cam is engageable with a release lever of the track. A second cam is engageable with a bypass cam that is raised over a stop as the seatback moves to the pitched position. An intermediate lock is engageable with a pin positioned on a middle support arm of the seat base when the seatback is in the pitched position.

Embodiments of the first aspect of the disclosure can include any one or a combination of the following features:
- the seating assembly further includes a rear support arm, wherein the rear support arm and the middle support arm are coupled to the second portion of the seatback;
- a latch assembly coupled to the second portion of the seatback, the latch assembly selectively engageable with a striker positioned on the track assembly, wherein the latch assembly is coupled to the striker when the seatback is in a design position; and an actuator positioned on the seatback, wherein the actuator is operably coupled to the latch assembly and configured to release the latch assembly from the striker, and further wherein the seat base is movable to the pitched position when the latch assembly is released;
- the seating assembly further includes a cross-member, wherein the first and second cams are operably coupled to the cross-member, and further wherein the cross-member and the first and second cams are movable between an engaged position and a disengaged position;
- the seating assembly further includes a bracket positioned on the track assembly and having an outer wall, wherein the outer wall defines an aperture, and a pin received by the aperture, wherein the pin includes a body portion, a first end, and a second end, and further wherein the first end has a linear edge and is coupled with the cross member and the second end has a slot coupled with a clock spring;

the seating assembly further includes a release button positioned beneath the release lever, wherein the release button is depressed by the release lever when the first cam engages with the release lever;

the seating assembly further includes a release bar having a first bar and a second bar, wherein the first bar forms a handle extending from beneath the seat base, and further wherein the second bar is coupled to the release lever and is configured to depress the release lever when rotated by the first bar;

the intermediate lock includes a hook, the hook defining a first notch and a second notch, the second notch positioned between the first notch and an end of the hook;

the seating assembly further includes a trigger cam positioned on a ramp of the track assembly, the trigger cam operably coupled to the intermediate lock; and/or the pin is selectively engageable with the first notch when the trigger cam is positioned on the ramp, and further wherein the pin is selectively engageable with the second notch when the trigger cam is removed from the ramp.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1:
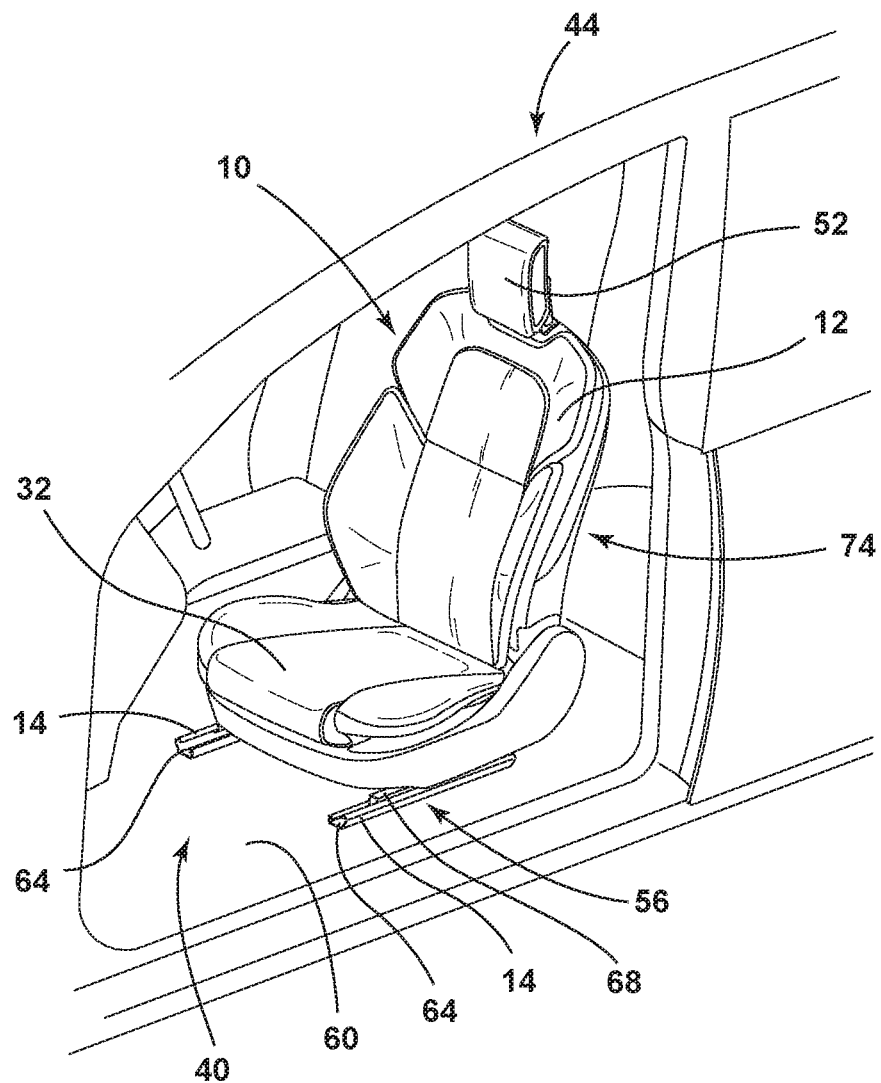
FIG. 1 is a top perspective view of a vehicle seating assembly.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed examples of the present disclosure are disclosed herein. However, it is to be understood that the disclosed examples are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a vehicle seating assembly with a pitch assembly. The seating assembly is movable between a design position and a pitched position. The pitch assembly is coupled to a track assembly by a plurality of brackets and arms. The arms rotate relative to the brackets and move the seating assembly into the pitched position. Cams positioned on the pitch assembly engage to release the track assembly and allow the seating assembly to slide forward along the track assembly. An intermediate lock holds the seating assembly in the pitched position while the seating assembly slides along the track assembly. A release bar may further release the track assembly when the seating assembly is in the design position.

Referring to the embodiment illustrated in FIGS. 1-17B, reference numeral 10 generally designates a seating assembly. The seating assembly 10 includes a seatback 12 movable into a pitched position along a track 14. A first cam 16 is engageable with a track release lever 18 of the track 14. A second cam 20 is engageable with a bypass cam 22. The bypass cam 22 is raised over a stop 24 as the seatback 12 moves to the pitched position. An intermediate lock 26 is engageable with a pin 28. The pin 28 is positioned on a middle support arm 30 of a seat base 32 when the seatback 12 is in the pitched position Referring now to FIG. 1, the seating assembly 10 is shown cushioned and upholstered and disposed within a front portion 40 of a vehicle 44. The seating assembly 10 includes the seatback 12 and the seat base 32. A headrest 52 may be coupled to the seatback. A track assembly 56 is operably coupled to a floor 60 of the vehicle 44, and the seat base 32 is operably coupled to the track assembly 56. The track assembly 56 may include a plurality of tracks 14 each defining a channel 64. Each channel 64 receives a slide 68 translatable fore and aft along the respective track 14. The seating assembly 10 is configured to pitch forward to allow access to a rear portion 74 of the vehicle 44. It is contemplated that the vehicle 44 may be any type of vehicle, such as a car, a truck, a van, etc. It is also contemplated that the concept set forth in this disclosure may be utilized in the front portion 40 of the vehicle 44 as well as the rear portion 74 of the vehicle 44, depending on the configuration of the vehicle 44.

Figure 2:
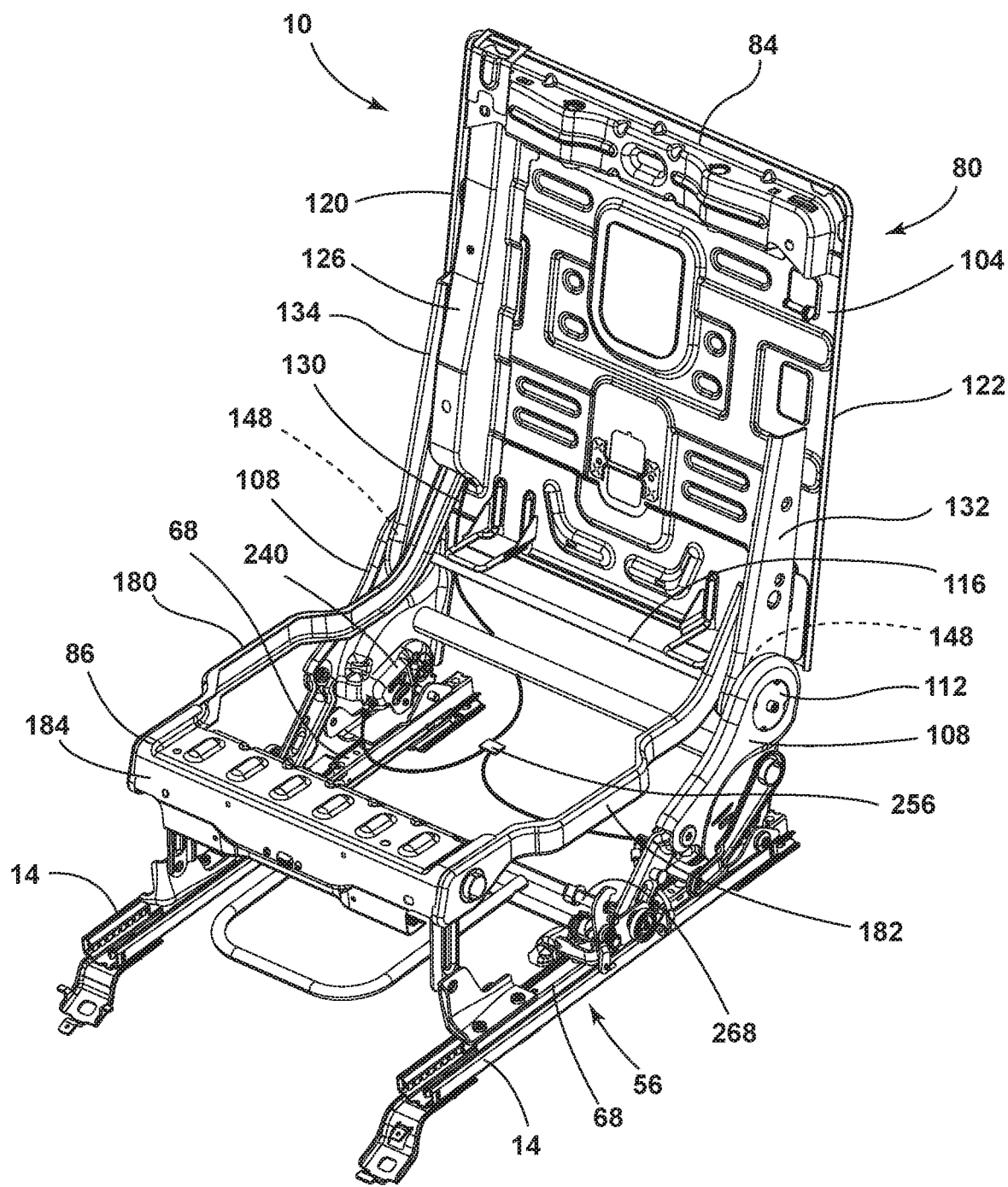
FIG. 2 is a side perspective view of a frame of a vehicle seating assembly with a pitching assembly in a design position.
Figure 3:
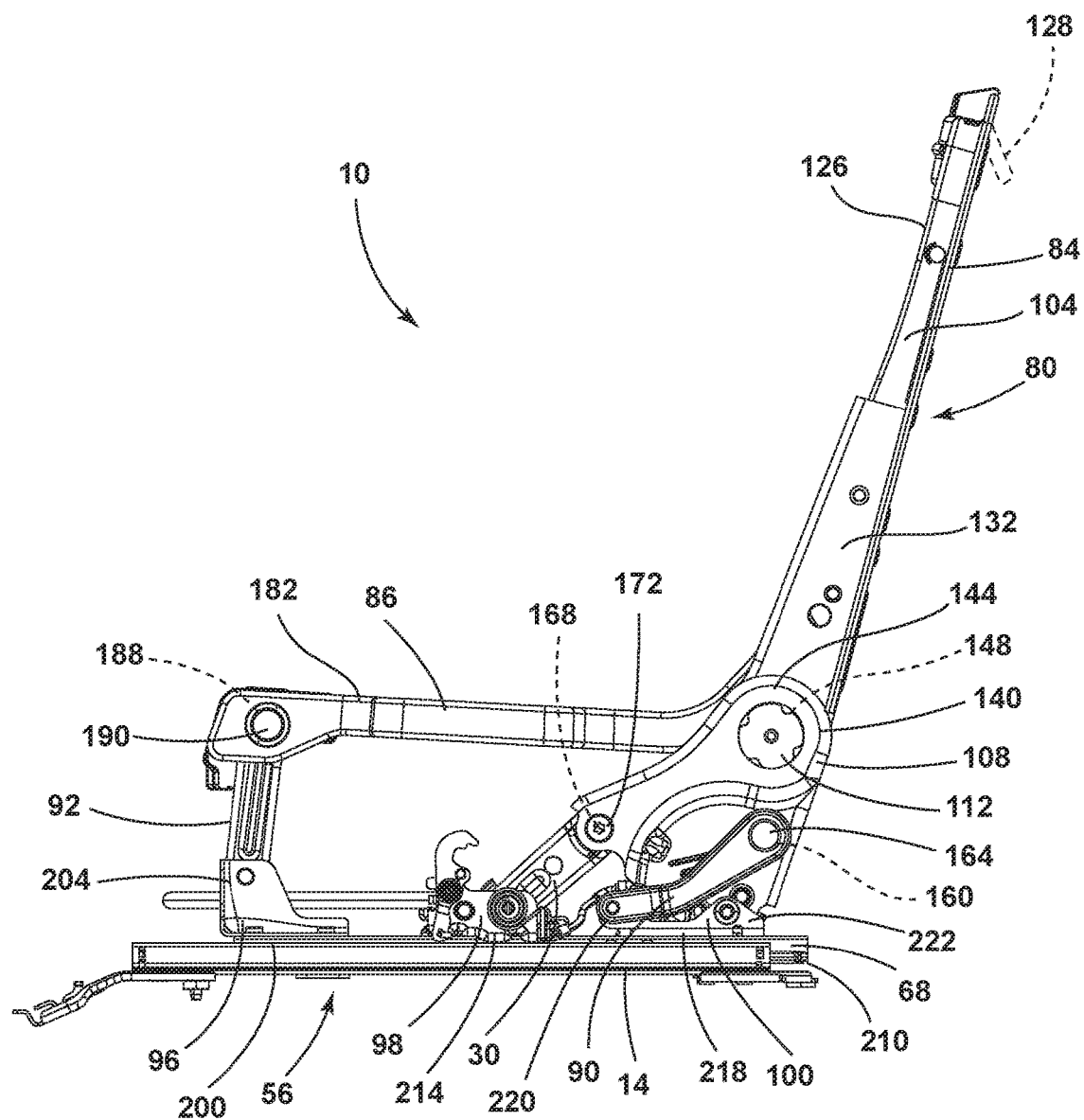
FIG. 3 is a side profile view of the frame of FIG. 2 with a seatback positioned upright.

Referring now to FIGS. 2 and 3, a frame 80 of the seating assembly 10 is shown coupled to the track assembly 56. The seatback frame 84 and the seat base frame 86 are coupled to the track assembly 56 by a plurality of support arms 30, 90, 92 and a plurality of brackets 96, 98, 100. The plurality of brackets 96, 98, 100 are positioned along and coupled to the slides 68 positioned within the tracks 14 of the track assembly 56.

The seatback frame 84 includes a first portion 104 and a second portion 108 pivotally coupled by a pair of recliner hearts 112 and a cross member 116. The first portion 104 extends upward and is generally planar with first and second sides 120, 122. An actuator channel 126 is positioned on the first side 120 of the first portion 104. An actuator 128 may be coupled to the actuator channel 126 such that the actuator 128 is accessible from the rear of the seatback frame 84. The actuator 128 may be movable between a neutral position (FIG. 4) and an actuated position (shown in FIG. 3 in phantom). The actuator 128 may be, for example, a handle, button, lever, or any other feature configured to place tension on an actuator member 130 operably coupled to the actuator 128. According to various examples, the actuator member 130 may be housed by the actuator channel 126. In other examples, the actuator member 130 may be coupled to the seatback frame 84 using guides and guide sleeves. In still other examples, the actuator member 130 may be coupled to the seatback frame 84 independent of guides, sleeves, or the actuator channel 126. The actuator member 130 may be, for example, a cable, a rod, or other feature configure to transfer tension from the actuator 128 when the actuator 128 moves between the neutral position and the actuated position.

A first side wall 132 may extend at least partially along the edge of the first side 120 of the seatback frame 84. Similarly, a second side wall 134 extends at least partially along the second side 122 of the seatback frame 84. According to various examples, the first and second side walls 132, 134 may extend the length of the first portion 104 of the seatback frame 84. In other examples, the side walls 132, 134 may extend only partially along the first portion 104 of the seatback frame 84. In various examples, the first and second side walls 132, 134 may be operably coupled with the seat base frame 86.

The second portion 108 of the seatback frame 84 includes a member 140 positioned on each side of the seating assembly 10. Each member 140 may have a generally triangular shape when viewed in profile (FIG. 3). A vertex 144 of the member 140 may receive one of the recliner hearts 112. The recliner hearts 112 are further received by a recline aperture 148 on one or both of the first and second sidewalls 132, 134 of the first portion 104 of the seatback frame 84. The member 140 may be positioned proximate to the respective track 14 and may be coupled to the respective track 14 by the middle support arm 30 and a rear support arm 90. It will be understood that the members 140 of the second portion 108 of the seatback frame 84 may be any shape including circular, oval, oblong, rectangular, square, or any other higher order polygon.

Figure 6:
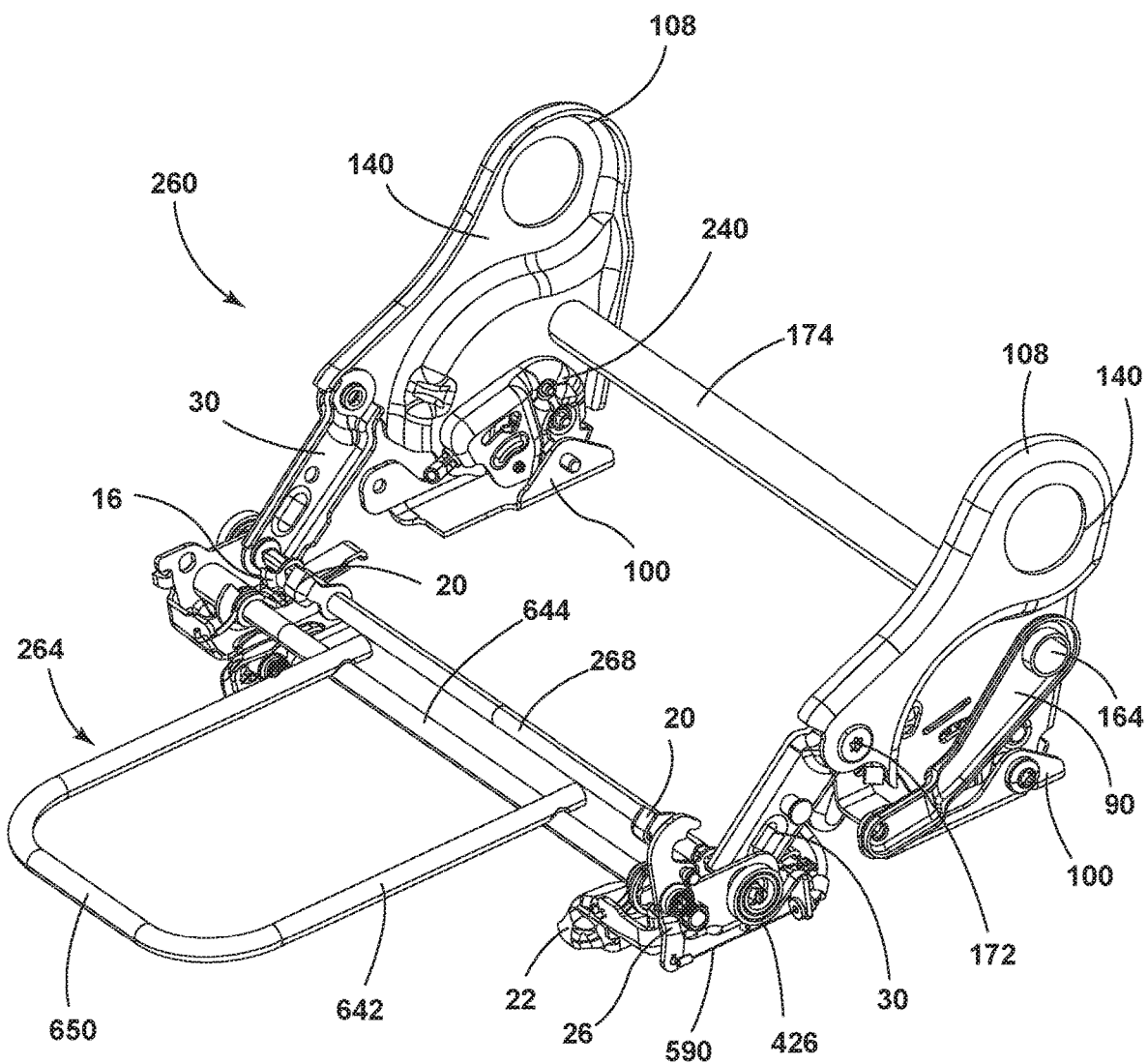
FIG. 6 is a top perspective view of a pitching assembly according to various examples.

Each member 140 defines a first pin aperture 160 positioned proximate the rear of the member 140 to substantially align with the first portion 104 of the seatback frame 84. The first pin aperture 160 is configured to receive a rear support arm pin 164. Similarly, each member 140 defines a second pin aperture 168 positioned proximate the front of the member 140 and forward of the first pin aperture 160. The second pin aperture 168 is configured to receive a middle support arm pin 172. According to various examples, the rear and middle support arm pins 164, 172 may be straight pins with or without heads, split pins, or any other fastener configured to be received by an aperture to couple objects and/or materials together. In other examples, the rear support arm pins 164 may be formed at the ends of a frame cross-member 174 (FIG. 6). It will be understood that other pivotable connections may be used in place of the pin apertures and the pins without departing from the scope of the present disclosure.

The seat base frame 86 includes first and second side members 180, 182. Each side member 180, 182 may be at least partially curved and may extend upward at an incline toward the first portion 104 of the seatback frame 84. Each side member 180, 182 may be coupled with one of the first and second side walls 132, 134 of the first portion 104 of the seatback frame 84. The seatback frame 84 may be pivotally coupled to the seat base frame 86 such that the seatback 12 is pivotably coupled to the seat base 32 (FIG. 1).

The seat base frame 86 further includes a front member 184 connecting the first and second side members 180, 182. According to various examples, the front member 184 and the first and second side members 180, 182 may be supported by at least one front support arm 92. In other examples, the front member 184 and the first and second side member 180, 182 may be supported by a pair of front support arms 92.

One of the first and second side members 180, 182 and the front member 184 may define a third pin aperture 188 configured to receive a front support arm pin 190. According to various examples, the front support arm pin 190 may be a straight pin with or without a head, a split pin, or any other fastener configured to be received by an aperture to couple objects and/or materials together. It will be understood that other pivotable connections may be used in place of the pin apertures and the pins without departing from the scope of the present disclosure.

Figure 4:
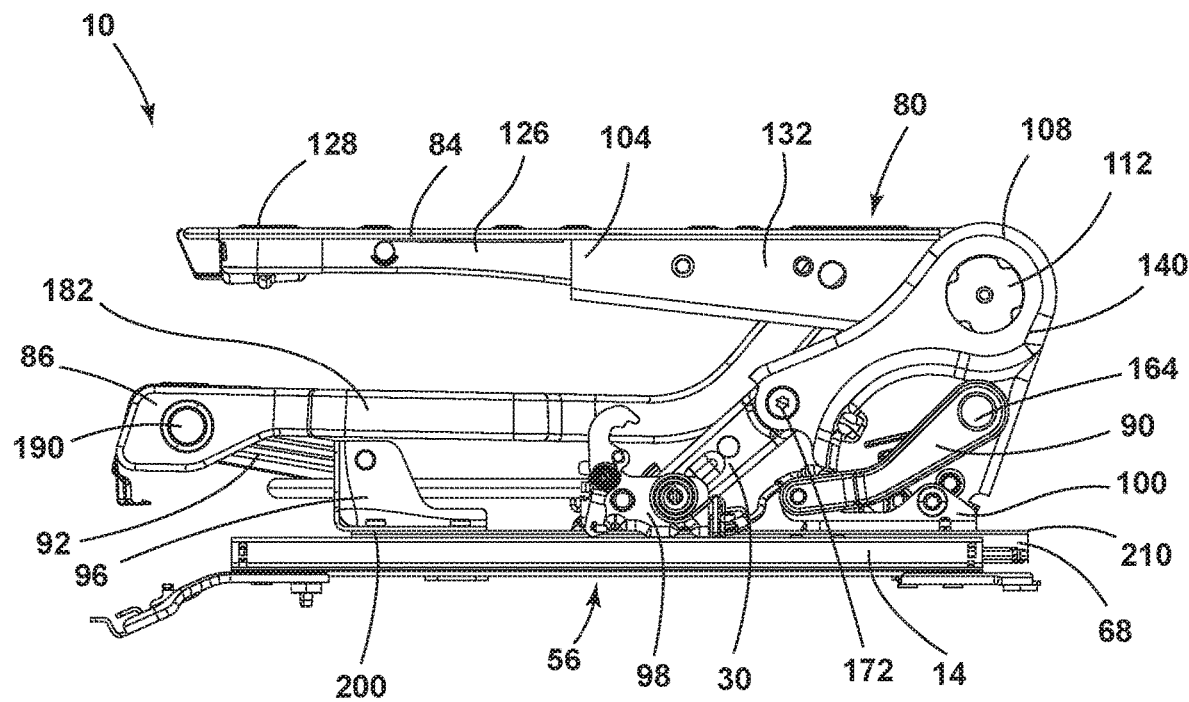
FIG. 4 is a side profile view of the frame of FIG. 2 with the seatback folded over.

Referring now to FIGS. 2-4, the track assembly 56 includes the plurality of tracks 14 defining the plurality of channels 64. Each channel 64 includes the respective slide 68. A front bracket 96 is positioned proximate a first end 200 of each of the slides 68. Each front bracket 96 includes an arm 204 extending upward from the slide 68. Each front support arm 92 is coupled to the respective front support arm pin 190 at a first end of the first support arm 92. Similarly, each front support arm 92 is pivotably coupled to the arm 204 of the respective front bracket 96 at a second end of the front support arm 92.

A middle bracket 98 is positioned on each of the slides 68 between the first end 200 of the slide 68 and a second end 210 of the slide 68. Each middle bracket 98 includes an outer wall 214 extending upward from the slide 68. Each middle support arm 30 is coupled to the respective middle support arm pin 172 at a first end of the middle support arm 30. Similarly, each middle support arm 30 is pivotably coupled to the outer wall 214 of the respective middle bracket 98 at a second end of the middle support arm 30, as discussed in further detail elsewhere herein.

A rear bracket 100 is positioned proximate the second end 210 of each of the slides 68. Each rear bracket 100 includes an outer wall 218 having a first portion 220 and a second portion 222, as discussed in further detail elsewhere herein. Each rear support arm 90 is coupled to the respective rear support arm pin 164 at a first end of the rear support arm 90. Similarly, each rear support arm 90 is pivotably coupled to the first portion 220 of the outer wall 218 at a second end of the rear support arm 90, as discussed in further detail elsewhere herein. It will be understood that the plurality of brackets 96, 98, 100 may be positioned on only one of the slides 68 without departing from the scope of the present disclosure.

Referring now to FIGS. 3 and 4, the seatback frame 84 of the frame 80 of the seating assembly 10 is movable between an upright position (FIG. 3) and a folded position (FIG. 4). The first portion 104 of the seatback frame 84 rotates about the recliner hearts 112 to move from the upright position to the folded position. As the first portion 104 of the seatback frame 84 moves into the folded position, the seat base frame 86 is moved forward relative to the seating assembly 10 and away from the second portion 108 of the seatback frame 84. The seat base frame 86 further moves downward toward the tracks 14 of the track assembly 56. The movement of the seat base frame 86 is facilitated by the front support arms 92. As the seat base frame 86 moves forward, the front support arms 92 rotate at the respective first and second ends to move from a first position (FIG. 3) to a second position (FIG. 4) such that the front support arms 92 are substantially parallel to the first and second side members 180, 182 of the seat base frame 86. The front support arms 92 may be at least partially positioned inward of the first and second side members 180, 182 of the seat base frame 86. When the seatback frame 84 is in the folded position, the first portion 104 of the seatback frame 84 is substantially parallel with the seat base frame 86 and the tracks 14 of the track assembly 56. The second portion 108 of the seatback frame 84 and the middle and rear support arms 30, 90 remain stationary as the first portion 104 of the seatback frame 84 moves into the folded position.

Figure 5A:
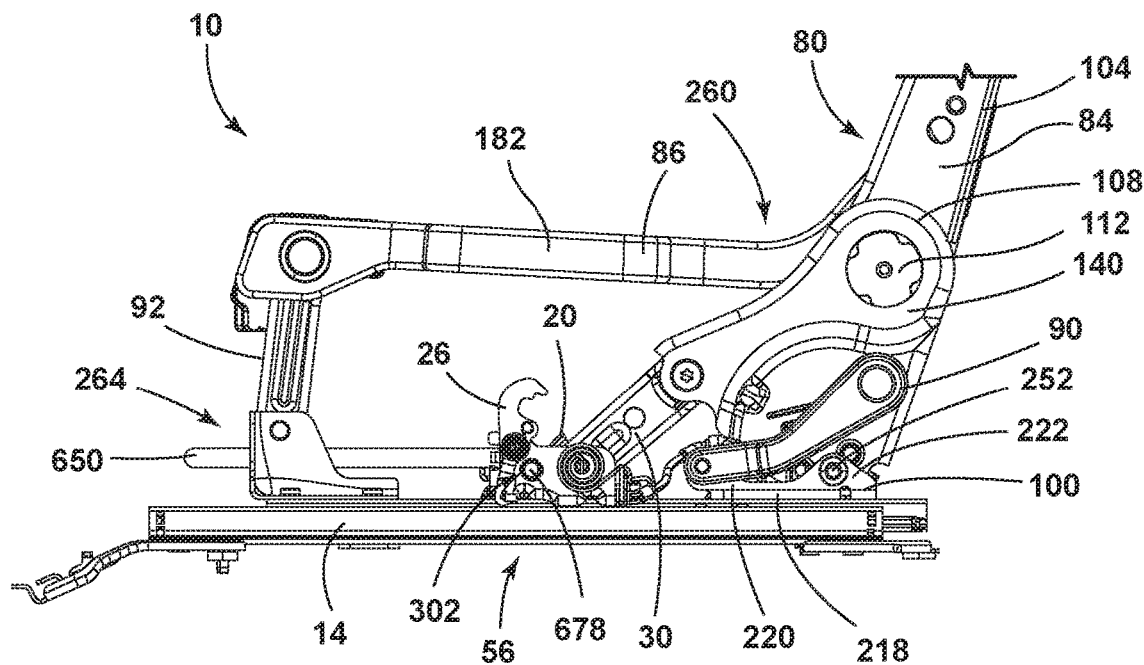
FIG. 5A is an enlarged first side profile view of the seating assembly of FIG. 1 in a design position.
Figure 5B:
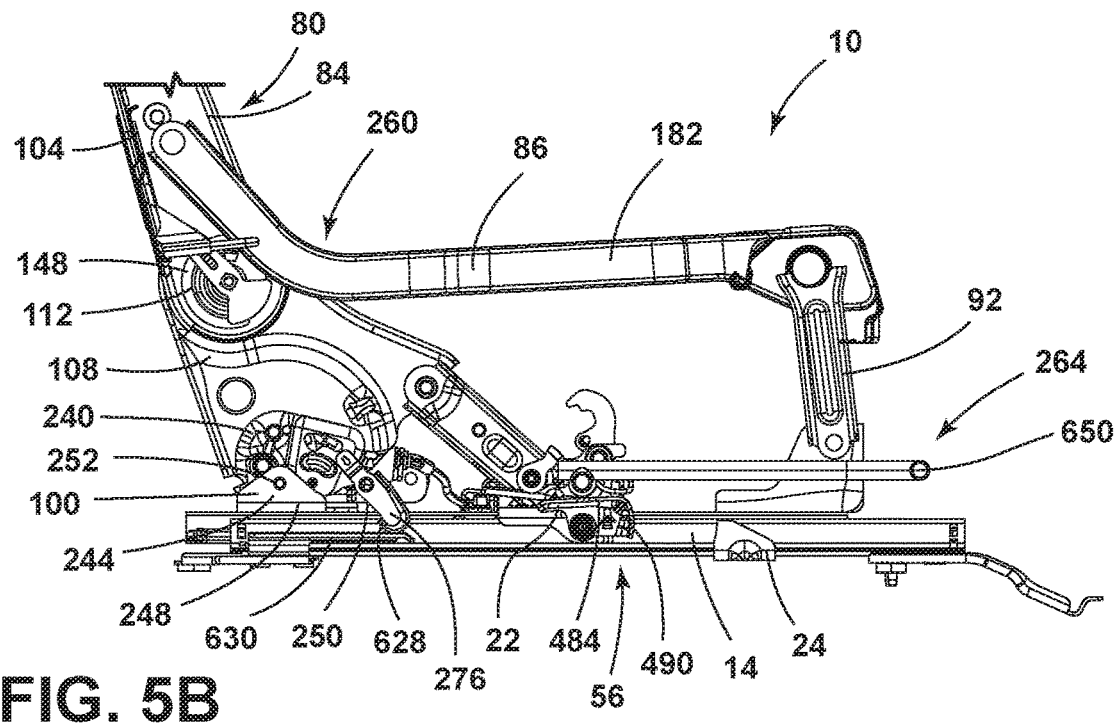
FIG. 5B is an enlarged second side profile view of the seating assembly of FIG. 1 in a design position.

Referring now to FIGS. 2, 5A, and 5B, a latch assembly 240 is selectively engageable with at least one rear bracket 100. According to various examples, a pair of latch assemblies 240 may be each engaged with a respective rear bracket 100. In other examples, a single latch assembly 240 may engage with one of the rear brackets 100. As discussed above, each rear bracket 100 includes the outer wall 218 having the first portion 220 and the second portion 222. Each rear bracket 100 further includes an inner wall 244 having a first portion 248 and a second portion 250. A striker 252 extends between the first portion 248 of the inner wall 244 and the second portion 222 of the outer wall 218. The latch assembly 240 is selectively engageable with the striker 252.

As shown in FIG. 2, the actuator member 130 extends down the seatback frame 84 and is coupled to at least one latch assembly 240. According to various examples, the actuator member 130 may be operably coupled to a splitter 256. The splitter 256 may allow the actuator member 130 to actuate a pair of latch assemblies 240. Each latch assembly 240 may be positioned on one of the members 140 of the second portion 108 of the seatback frame 84. Alternatively, each latch assembly 240 may be positioned on one of the rear support arms 90. The latch assembly 240 may be a dual cam latch assembly, a single cam latch assembly, or any other form of latch assembly configured to selectively receive the striker 252 of the rear bracket 100.

Referring now to FIGS. 5A-9, a pitch assembly 260 of the seating assembly 10 may include the plurality of support arms 30, 90, 92 and the plurality of brackets 96, 98, 100 operably coupling the frame 80 of the seating assembly 10 to the track assembly 56. The pitch assembly 260 further includes the latch assembly 240 and a release bar assembly 264. A cross-member 268 extends between each of the tracks 14 of the track assembly 56 and includes the first and second cams 16, 20. The stop 24 may be positioned on at least one of the tracks 14 of the track assembly 56, and the bypass cam 22 may be positioned on the middle bracket 98 of the pitch assembly 260. The intermediate lock 26 of the pitch assembly 260 may also be positioned on the middle bracket 98 and may be coupled to a trigger cam 276.

As discussed elsewhere herein, the middle bracket 98 may have a front wall 290 extending upward toward the seat base frame 86 of the seating assembly 10 and integrally formed with the outer wall 214 at a first end of the outer wall 214. The outer wall 214 may extend from a side of a base 294 of the middle bracket 98. According to various examples, the outer wall 214 may extend further upward from the base 294 of the middle bracket 98 than the front wall 290. In other examples, the outer wall 214 and the front wall 290 may be substantially similar in height. In still other examples, the middle bracket 98 may include only the outer wall 214 with an open front.

Figure 7A:
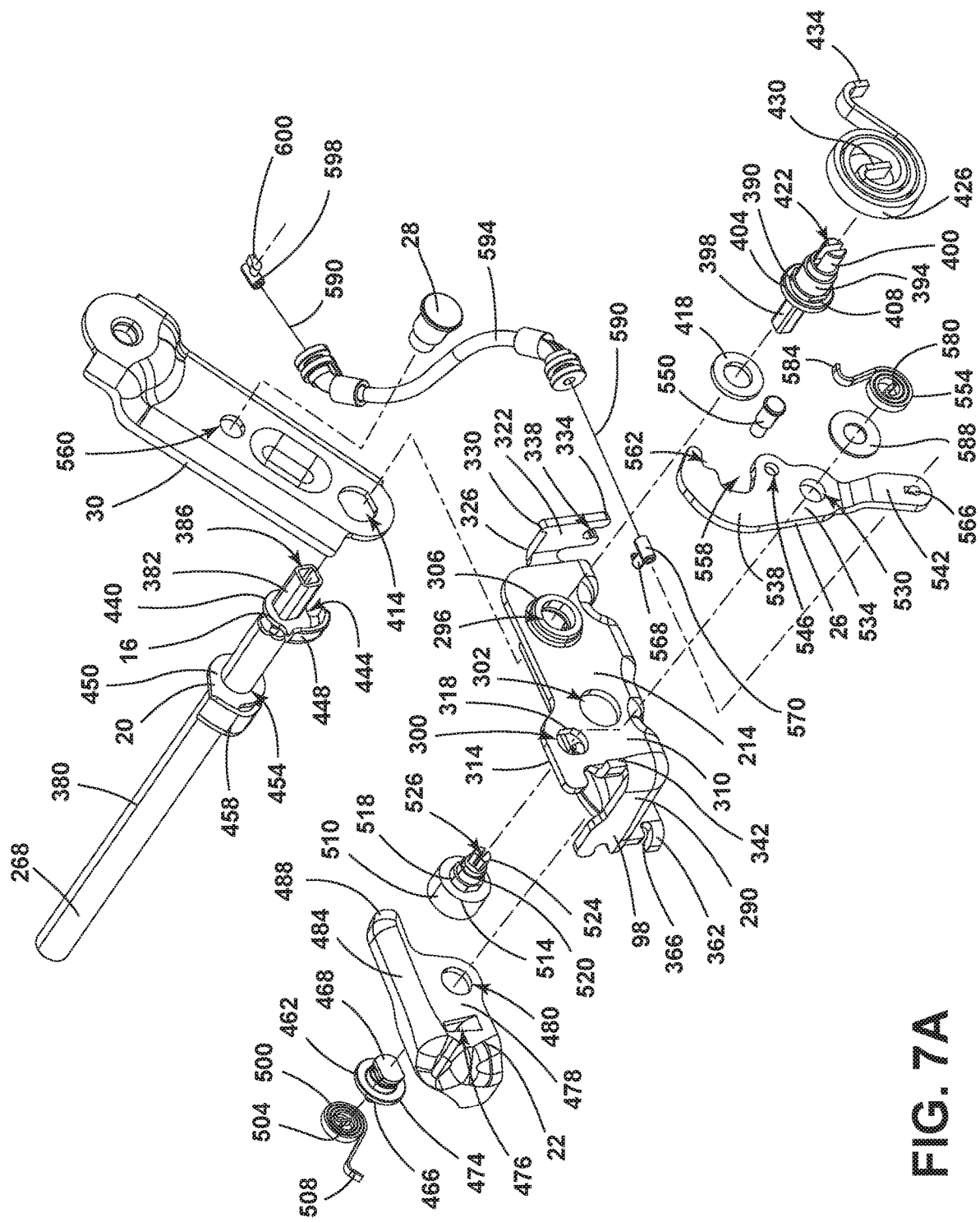
FIG. 7A is an exploded view of a first portion of the pitching assembly of FIG. 6.
Figure 7B:
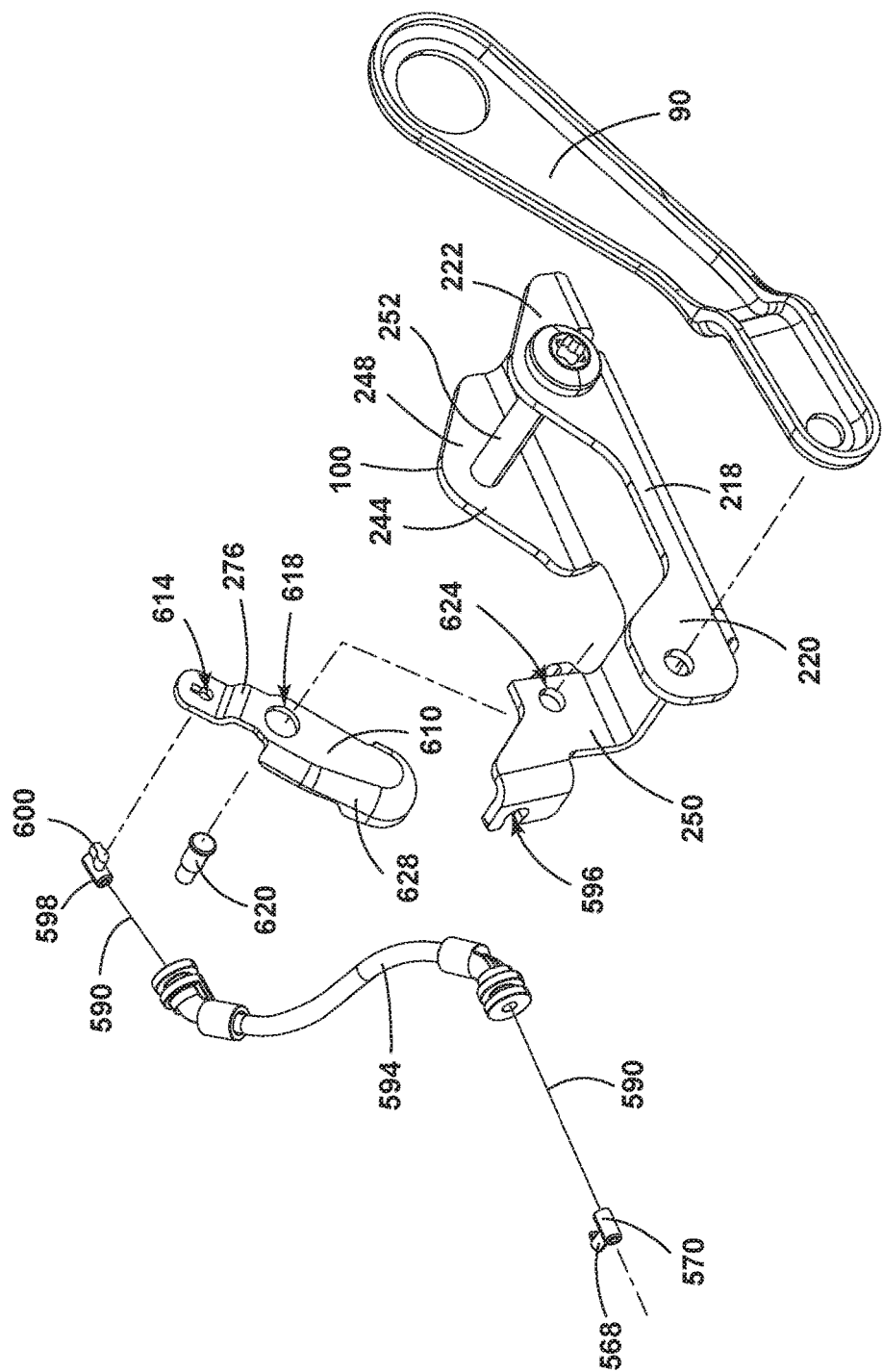
FIG. 7B is an exploded view of a second portion of the pitching assembly of FIG. 6.
Figure 8A:
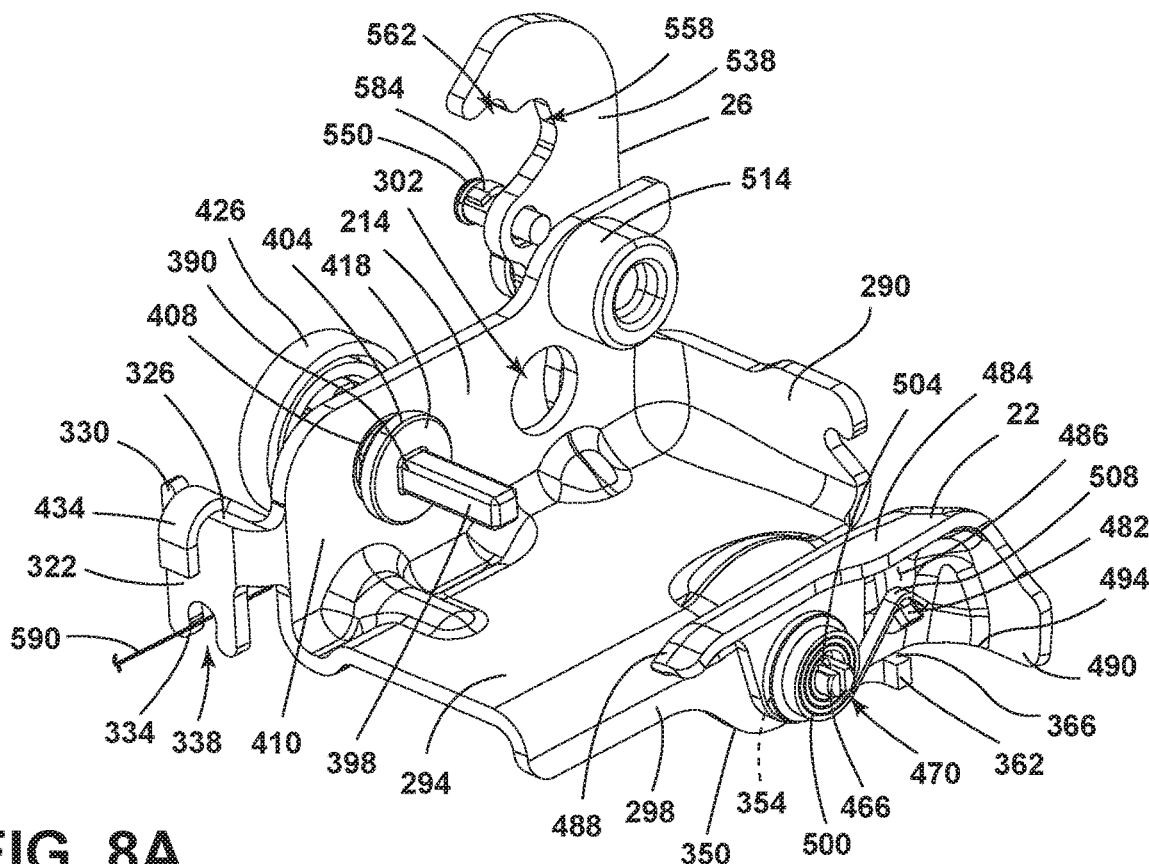
FIG. 8A is a first side profile view of a bracket of the pitching assembly of FIG. 6.
Figure 8B:
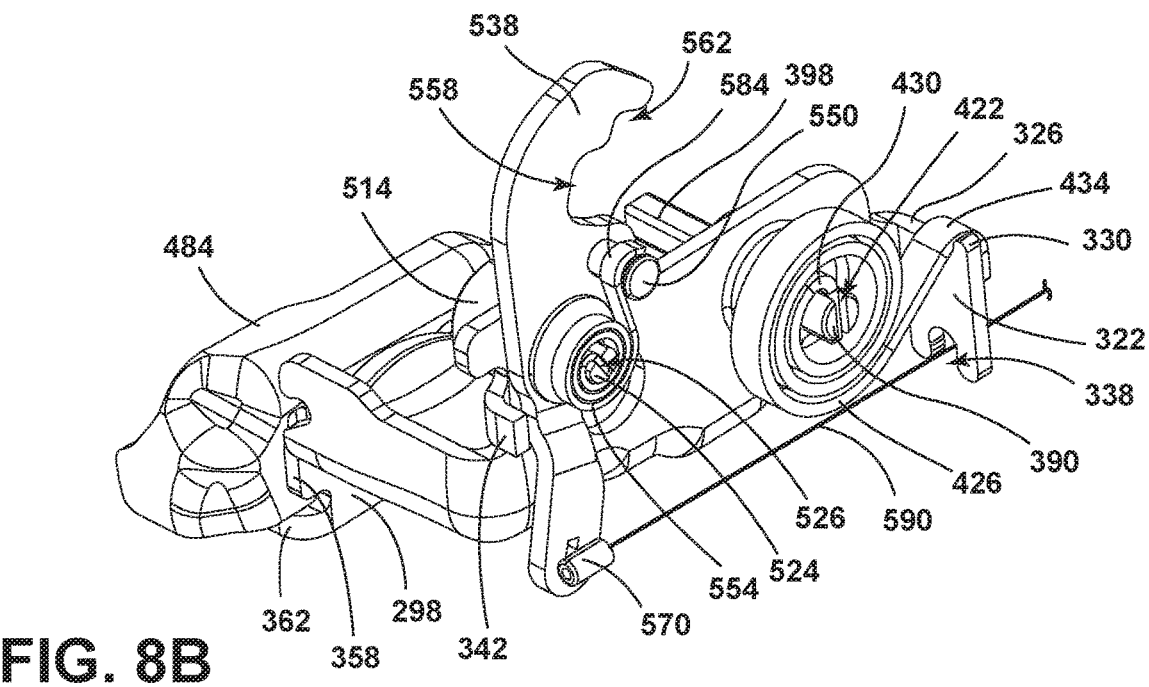
FIG. 8B is a second side profile view of a bracket of the pitching assembly of FIG. 6.
Figure 9:
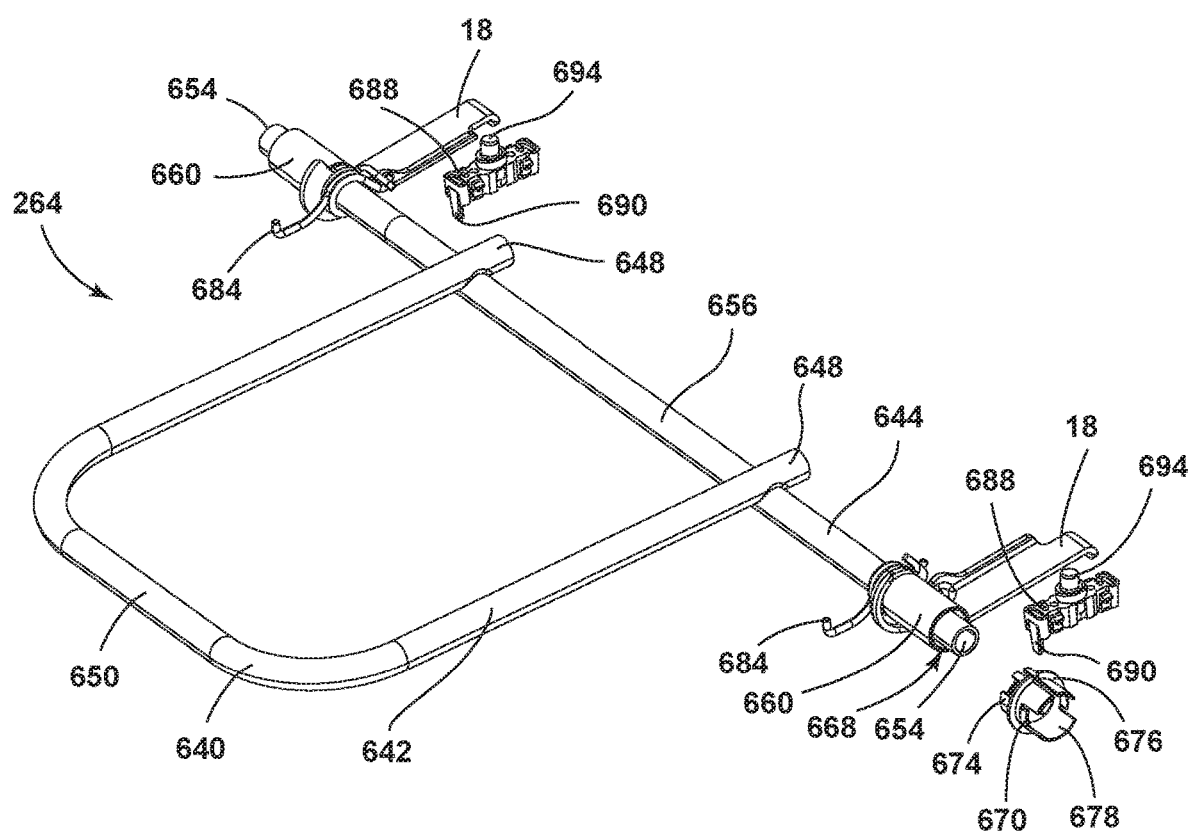
FIG. 9 is a top perspective view of a release bar of the pitching assembly of FIG. 7.
Figure 10:
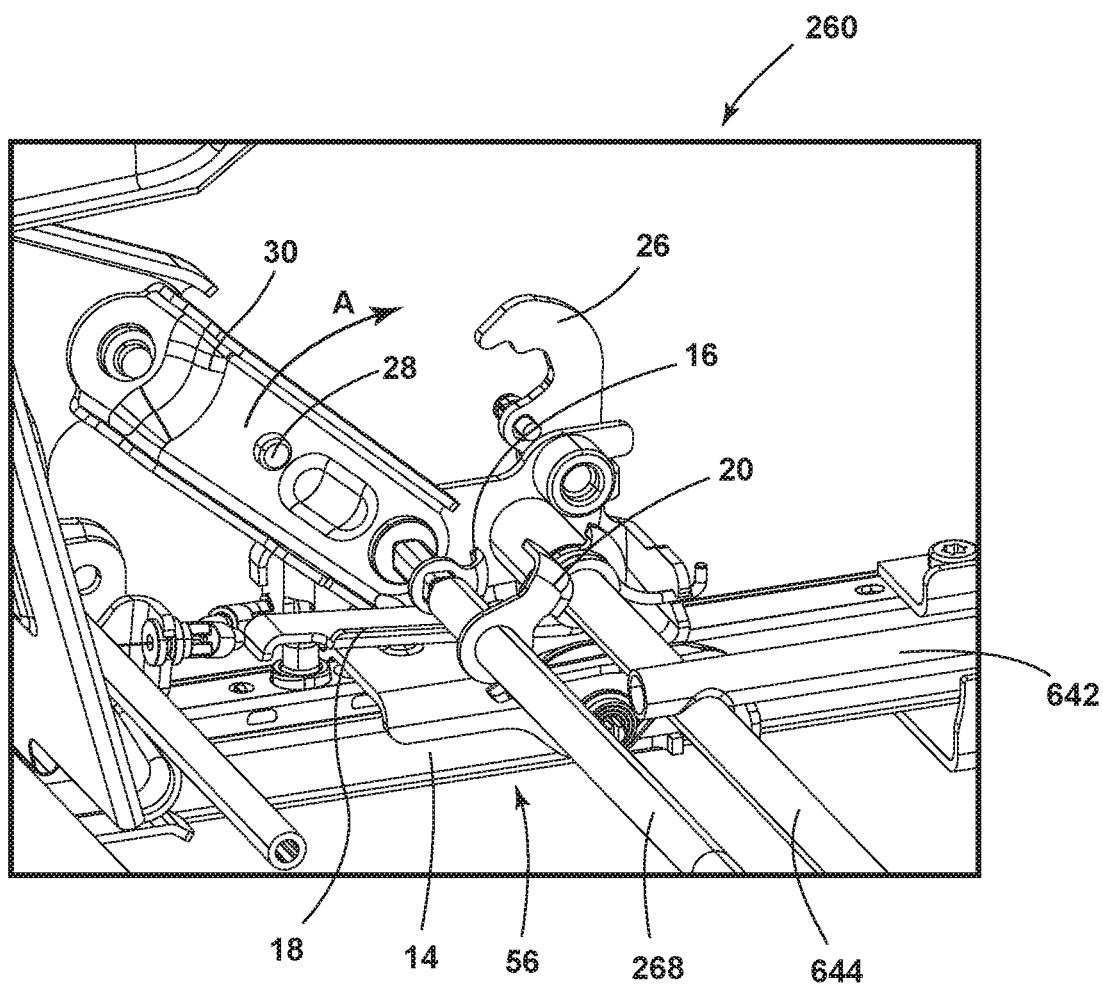
FIG. 10 is a side perspective view of the pitching assembly on the frame of FIG. 2 with the pitching assembly in a design position.
Figure 11:
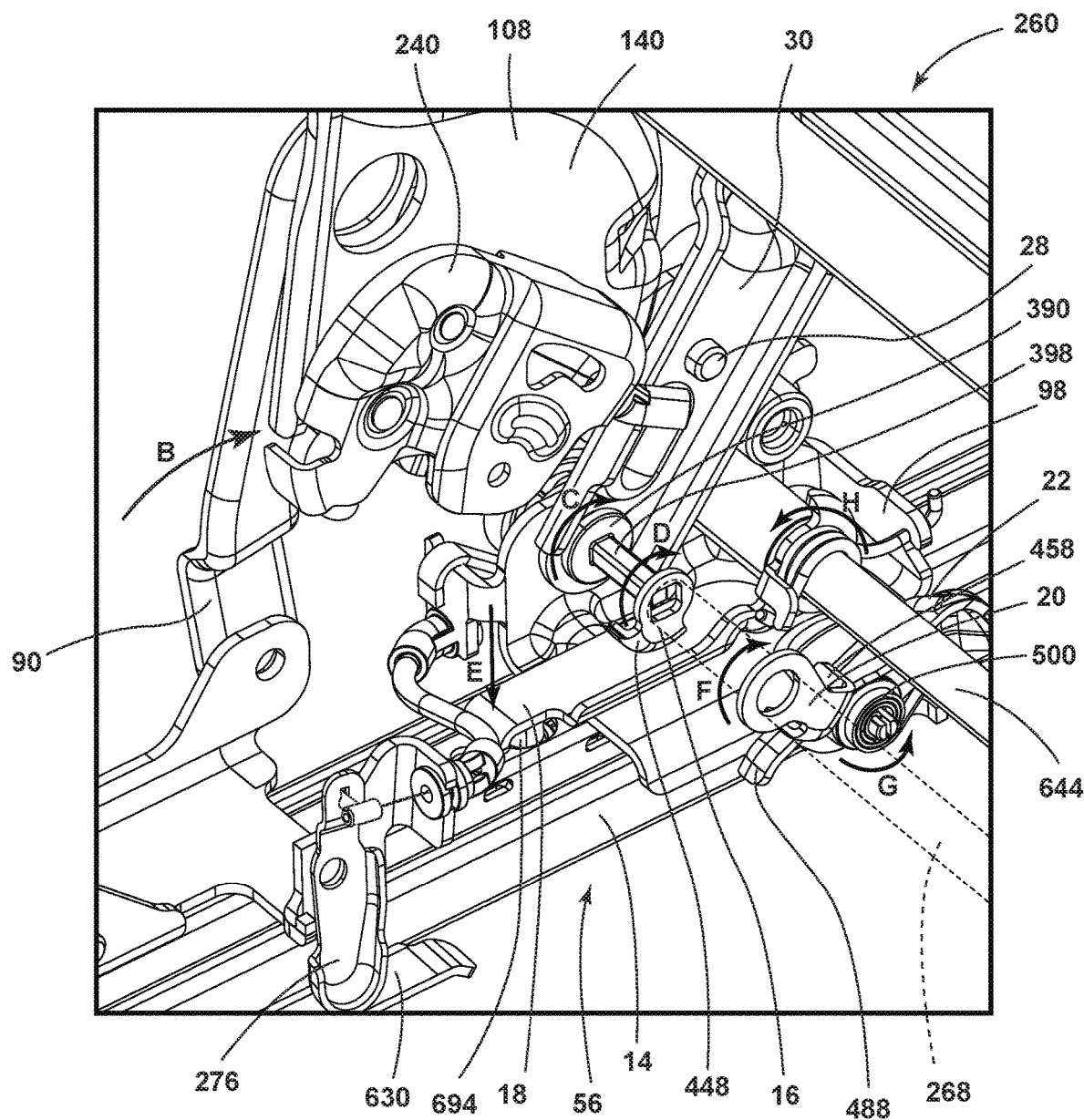
FIG. 11 is a top perspective view of the pitching assembly on the frame of FIG. 2 with the pitching assembly in a pitched position.

As shown in FIG. 7A, the outer wall 214 may define a plurality of openings including a cross-member opening 296, an intermediate lock opening 300, and a release bar opening 302. The cross-member opening 296 may be defined at a second end of the outer wall 214 opposite the first end. A rim 306 may be positioned around a periphery of the cross-member opening 296 and may extend outward from a first side 310 of the outer wall 214. The intermediate lock opening 300 may be positioned proximate a top edge 314 of the outer wall 214. The intermediate lock opening 300 may be defined by at least one linear edge 318. The release bar opening 302 may be defined between the cross-member opening 296 and the intermediate lock opening 300.

As shown in FIGS. 7A-8A, the outer wall 214 may include a first protrusion 322 extending outward from the seating assembly 10 at the second end of the outer wall 214 and oriented substantially perpendicular to the outer wall 214. The first protrusion 322 may have an upper edge 326 culminating in a stop 330. The first protrusion 322 may also have a lower edge 334 at least partially defining a channel 338. Similarly, a second protrusion 342 may extend perpendicularly from the first end of the outer wall 214.

As shown in FIGS. 7A-8B, an inner wall 298 may extend downward along a side of the respective track 14 and away from the seat base frame 86 of the seating assembly 10. The inner wall 298 may extend from a side of the base 294 of the middle bracket 98 opposite the outer wall 214. A bottom edge 350 of the inner wall 298 may be at least partially non-linear. An aperture 354 may be defined proximate the bottom edge 350 and a front edge 358 of the inner wall 298. According to various examples, the aperture 354 may be defined by at least one non-linear edge. A stop protrusion 362 may extend from the front edge 358 of the inner wall 298 and may be oriented to be perpendicular to the inner wall 298. The stop protrusion 362 includes an upper lip 366 configured to selectively support the bypass cam 22.

Referring now to FIGS. 6 and 7A, the cross-member 268 extends beneath the seat base frame 86 (FIG. 2) and between the tracks 14. The cross-member 268 includes a central portion 380 having end portions 382. According to various examples, the central portion 380 may have a generally circular cross-sectional shape. According to other examples, the cross-section of the central portion 380 may be another shape including, for example, oval, oblong, square, rectangular, or any higher order polygon. Similarly, each end portion 382 has a cross-section with at least one linear side. For example, the cross-section of the end portions 382 may be a square, a rectangle, or a semicircle. Each end portion 382 may further define a channel 386 configured to receive a portion of a pivot pin 390. The pivot pin 390 allows the cross-member 268 to be movable between a disengaged position and an engaged position.

As shown in FIGS. 6-8B, the pivot pin 390 may include a central portion 394 positioned between a first end portion 398 and a second end portion 400. When the pivot pin 390 is received within the cross-member opening 296 of the middle bracket 98, the central portion 394 is positioned within the cross-member opening 296. In various examples, the central portion 394 is proportioned such that the central portion 394 is fully enclosed within the cross-member opening 296 and the second end portion 400 of the pivot pin 390 extends outward from the rim 306 of the outer wall 214 of the middle bracket 98.

A first lip 404 may extend outward of the central portion 394 proximate the first end portion 398 of the pivot pin 390. A second lip 408 may extend outward of the central portion 394 and may be positioned abutting the first lip 404 and proximate the second end portion 400. When the pivot pin 390 is received within the cross-member opening 296, the second lip 408 is aligned with a second side 410 of the outer wall 214. The second lip 408 may be defined by at least one linear edge and is configured to space the first lip 404 away from the second side 410 of the outer wall 214. When the middle support arm 30 is coupled with the middle bracket 98, an aperture 414 defined by the middle support arm 30 receives the first lip 404. The middle support arm 30 is thus positioned between the first lip 404 and the second side 410 of the outer wall 214 of the middle bracket 98. The aperture 414 is defined to complement the second lip 408 including the at least one linear edge such that rotation of the middle support arm 30 results in simultaneous rotation of the pivot pin 390.

The first end portion 398 may be configured to be received within the channel 386 of the respective end portion 382 of the cross-member 268. The first end portion 398 of the pitch pin may include at least one linear edge and has a cross-sectional shape configured to complement the cross-sectional shape of the channel 386 of the respective end portion 382 of the cross-member 268. A washer 418 may be positioned between the first lip 404 of the pivot pin 390. When the first end portion 398 of the pivot pin 390 is received within the respective channel 386, the alignment of the respective linear edges of the channel 386 and the first end portion 398 provides a contact surface for transferring the rotational moment of the pivot pin 390 as the middle support arm 30 rotates to the cross-member 268. It will be understood that the arrangement of the middle support arm 30, the first lip 404, the washer 418, the clock spring 426, and the outer wall 214 is exemplary and any arrangement that provides the recited mobility and engagement of the features may be used without departing from the scope of the present disclosure.

The second end portion 400 of the pivot pin 390 may define a slot 422. A clock spring 426 is positioned on the second end portion 400 of the pivot pin 390 such that the second end 400 extends through the center of the clock spring 426. A center arm 430 of the clock spring 426 is received within the slot 422 defined by the second end portion 400 of the pivot pin 390. An outer arm 434 of the clock spring 426 is supported by the upper edge 326 of the protrusion 322 extending outwardly from the outer wall 214 of the middle bracket 98. The stop 330 prevents the clock spring 426 from being inadvertently removed from the second end portion 400 of the pivot pin 390. The clock spring 426 is configured to bias the cross-member 268 and the middle support arm 30 in the design position. In other words, the clock spring 426 is positioned on the first side 310 of the outer wall 214 of the middle bracket 98, and the cross-member 268 and the middle support arm 30 are positioned on the second side 410 of the outer wall 214 of the middle bracket 98.

Referring again to FIGS. 6 and 7A, the first cam 16 is positioned on one of the end portions 382 of the cross-member 268. In various examples, each end portion 382 may include one of a pair of first cams 16. In other examples, the first cam 16 may be located on just one of the end portions 382 of the cross-member 268. The first cam 16 includes a body portion 440 defining an aperture 444 configured to fit over the end portion 382 of the cross-member 268. The aperture 444 may be defined by at least one linear edge and is defined to complement the cross-sectional shape of the central portion 380 of the cross-member 268. The complemented shape of the aperture 444 allows the first cam 16 to be fixedly coupled with the respective end portion 382 such that first cam 16 rotates with the cross-member 268. A foot 448 extends from the body portion 440 of the first cam 16. The foot 448 extends in a direction that is substantially perpendicular to the body portion 440 of the first cam 16. According to various examples, the foot 448 may be at least partially non-linear. In other examples, the foot 448 may be substantially linear. In still other examples, the foot 448 may include a corner portion that may be substantially angular or radiused.

The second cam 20 is positioned on the central portion 380 of the cross-member 268. The second cam 20 includes a body portion 450 defining a substantially circular aperture 454 configured to fit over the central portion 380 of the cross-member 268. The aperture 454 is defined to complement the cross-sectional shape of the central portion 380 of the cross-member 268. The body portion 450 of the second cam 20 is fixedly coupled with the central portion 380 of the cross-member 268 such that the second cam 20 is rotated with the central portion 380 of the cross-member 268 but is not rotatable separately from the cross-member 268. A foot 458 extends from the body portion 450 of the second cam 20. The foot 458 extends in a direction that is substantially perpendicular to the body portion 450 of the second cam 20. According to various examples, the foot 458 may be at least partially non-linear. In other examples, the foot 458 may be substantially linear. In still other examples, the foot 458 may include a corner portion that may be substantially angular or radiused.

Referring again to FIGS. 6-8B, a cam pin 462 is received by the aperture 354 of the inner wall 298 of the middle bracket 98. The cam pin 462 includes a first end portion 466 and a second end portion 468. The first end portion 466 defines a slot 470. The second end portion 468 includes at least one linear edge. The cross-section of the second end portion 468 is configured to complement the shape of the aperture 354 of the inner wall 298 of the middle bracket 98. When the second end portion 468 is received by the aperture 354 of the inner wall 298 of the middle bracket 98, the cam pin 462 is fixedly coupled with the inner wall 298. A lip 474 separates the first and second end portions 466, 468. The lip 474 acts as a spacer between the bypass cam 22 and the inner wall 298 of the middle bracket 98.

The bypass cam 22 includes a body 478 defining an aperture 480. The aperture 480 may be generally circular in shape and may be configured to receive the first end portion 466 of the cam pin 462. The first end portion 466 extends through the aperture 480 a first distance. The body 478 of the bypass cam 22 further includes a support arm 482 extending from an inner surface 486 of the body 478 of the bypass cam 22. According to various examples, the support arm 482 may be framed by an opening 476 defined by the body 478. In other examples, the support arm 482 may be integrally formed with the inner surface 486 of the body 478 of the bypass cam 22.

The bypass cam 22 further includes an upper rim 484 having a first end 488 and a second end 490. The upper rim 484 is configured to extend from the body 478 of the bypass cam 22 to cover the first end portion 466 of the cam pin 462 and the support arm 482. The first end 488 is positioned proximate the cross-member 268. According to various examples, the first end 488 may be a rearwardly extending arm. In other examples, the first end 488 may be continuous with the body 478 of the bypass cam 22 and the second end 490 of the upper rim 484. The second end 490 includes a bottom edge 494 configured to be supported by the upper lip 366 of the stop protrusion 362 of the inner wall 298 of the middle bracket 98.

A bypass clock spring 500 is positioned over the first end portion 466 of the cam pin 462. A center arm 504 of the bypass clock spring 500 is received by the slot 470 defined by the first end portion 466 of the cam pin 462. An outer arm 508 of the bypass clock spring 500 is supported by the support arm 482. The bypass clock spring 500 is configured to bias the bypass cam 22 in a lowered position. The bypass cam 22 is rotatable between a raised position and a lowered position.

Referring to FIG. 5B, the stop 24 is positioned on the respective track 14 between the first end 200 of the slide 68 and the bypass cam 22. According to various examples, the stop 24 may be generally triangular. In other examples, the stop 24 may be circular, oblong, square, rectangular, or shaped as any other higher order polygon. The stop 24 may have a first height. The first height is greater than a distance between the second end 490 of the upper rim 484 of the bypass cam 22 and the bottom of the respective track 14. The stop 24 is configured to prevent forward movement when the bypass cam 22 is in the design position, as discussed in further detail elsewhere herein.

Referring again to FIGS. 6-8B, a lock pin 510 is received by the intermediate lock opening 300 defined by the outer wall 214 of the middle bracket 98. The lock pin 510 includes a base portion 514 having a generally circular cross-section. A lip 518 extends from the base portion 514 and includes at least one linear edge. The lip 518 is shaped to complement the intermediate lock opening 300. When the lock pin 510 is received by the intermediate lock opening 300, the lip 518 is positioned within the intermediate lock opening 300 such that the base portion 514 is substantially abutting the outer wall 214 of the middle bracket 98. A central portion 520 extends from the lip 518. The central portion 520 has a generally circular cross-section and has a cross-sectional area that is generally less than a cross-sectional area of the base portion 514. In some examples, the cross-sectional area of the central portion 520 may further be less than the cross-sectional area of the lip 518. An end portion 524 extends from the central portion 520 and may define a slot 526.

The intermediate lock 26 includes a body 534 positioned between a hook 538 and a lever 542. The body 534 defines an aperture 530 proximate the lever 542. The aperture 530 is configured to receive the central portion 520 of the lock pin 510 such that the intermediate lock 26 is rotatable about the central portion 520 of the lock pin 510 and is movable between a first position and a second position. The body 534 of the intermediate lock 26 further defines a receiving well 546 configured to receive a support pin 550. The support pin 550 may be a pin having a head, a straight pin, or any other protrusion receivable by the receiving well 546 and configured to at least partially support a lock clock spring 554.

The lock clock spring 554 includes a center arm 580 and an outer arm 584. The end portion 524 of the lock pin 510 is received by the lock clock spring 554 such that the center arm 580 of the lock clock spring 554 is positioned within the slot 526 of the end portion 524. The outer arm 584 is supported by the support pin 550. The lock clock spring 554 is configured to bias the intermediate lock 26 in the first position. According to some examples, a washer 588 may be positioned between the intermediate lock 26 and the lock clock spring 554.

The hook 538 and the body 534 of the intermediate lock 26 together define a first notch 558. The hook 538 may further define a second notch 562 at least partially in communication with the first notch 558. The second notch 562 is defined between the first notch 558 and an end of the hook 538. Each of the notches 558, 562 may be configured to receive the pin 28. In some examples, each of the notches 558, 562 may be at least partially nonlinear such that each of the notches 558, 562 may selectively secure the pin 28 within the respective notch 558, 562. The pin 28 is coupled to the middle support arm 30 and is at least partially received by an opening 560 defined between the first and second ends of the middle support arm 30. According to various examples, the pin 28 may be a pin having a head, a straight pin, or any other stop protrusion receivable by the first and second notches 558, 562 and configured to be secured within one of the first notch 558 and the second notch 562.

The lever 542 of the intermediate lock 26 may define an attachment aperture 566. The attachment aperture 566 is configured to receive an attachment portion 568 of a first anchor 570. According to various examples, the attachment aperture 566 may have a linear portion and a circular portion to complement the shape of the attachment portion 568 of the first anchor 570 such that the first anchor 570 is coupled to the lever 542 as the attachment portion 568 is rotated into engagement with the lever 542. In other examples, the attachment aperture 566 may be generally circular and configured to couple the attachment portion 568 of the first anchor 570 to the lever 542 using a snap feature or other connection feature such as, for example, welding, fasteners, or pins.

The first anchor 570 is operably coupled to a first end of a cable 590. The cable 590 extends rearward of the intermediate lock 26 and through a cable sleeve 594. The cable sleeve 594 may be coupled to the middle bracket 98 by way of the channel 338 of the protrusion 322. In some examples, the cable sleeve 594 may be curved to route the cable 590 from the outer side of the track assembly 56 to the inner side of the track assembly 56. The cable sleeve 594 may be coupled to the rear bracket 100 by way of a channel 596 defined by the second portion 250 of the inner wall 244. A second anchor 598 may be coupled with a second end of the cable 590. The second anchor 598 may be the same design as the first anchor 570 including an attachment portion 600. The attachment portion 600 of the second anchor 598 is configured to couple the cable 590 to the trigger cam 276 and subsequently operably coupled the trigger cam 276 with the intermediate lock 26.

Referring to FIGS. 5A-7B, the trigger cam 276 includes a body 610 defining an attachment aperture 614 at a first end. According to various examples, the attachment aperture 614 may have a linear portion and a circular portion to complement the shape of the attachment portion 600 of the second anchor 598 such that the second anchor 598 is coupled to the trigger cam 276 as the attachment portion 600 is rotated into engagement with the trigger cam 276. In other examples, the attachment aperture 614 may be generally circular and configured to couple the attachment portion 600 of the second anchor 598 to the trigger cam 276 using a snap feature or other connection feature such as, for example, welding, fasteners, or pins.

The body 610 of the trigger cam 276 further defines an opening 618 configured to receive a pin 620. The pin 620 is configured to be received by the opening 618 defined by the trigger cam 276 and an opening 624 defined by the second portion 250 of the inner wall 244 of the rear bracket 100. The pin 620 pivotally couples the trigger cam 276 with the rear bracket 100 such that the trigger cam 276 is movable between a first position and a second position.

The trigger cam 276 further includes a foot 628 extending at least partially about the periphery of the body 610. The foot 628 may be at least partially nonlinear according to various examples. In other examples, the foot 628 may be substantially rounded. In still other examples, the foot 628 may be any shape that provides a base for the trigger cam 276 so that the trigger cam 276 is pivotable between the first and second positions. The foot 628 is configured to abut a ramp 630. The ramp 630 is positioned on the inner side of the respective track 14 and biased the trigger cam 276 in the first position. According to various examples, the ramp 630 may be substantially linear across its entirety. In other examples, the ramp 630 may have a nonlinear end proximate the trigger cam 276.

Referring now to FIGS. 5A-6 and 9, the release bar assembly 264 includes a release bar 640 having a first bar 642 and a second bar 644. The first bar 642 includes end portions 648 and forms a handle 650 extending from beneath the seat base frame 86 (FIGS. 5A and 5B). The second bar 644 includes end portions 654 framing a middle portion 656. The end portions 648 of the first bar 642 are coupled with the middle portion 656 of the second bar 644 such that movement of the first bar 642 results in rotation of the second bar 644.

The end portions 654 of the second bar 644 each include an outer shell 660 positioned around the respective end portion 654. The outer shell 660 and the end portion 654 together define a generally circular channel 668 at each end of the second bar 644. Each channel 668 is configured to at least partially receive a coupling ring 670. Each coupling ring 670 includes first connectors 674 extending from a first side of a lip 676. The first connectors 674 are received by the respective channel 668. The first connectors 674 are configured to rotatably couple the second bar 644 to the coupling ring 670 such that the outer shell 660 and the end portion 654 are pivotable about the first connectors 674. Second connectors 678 extend from a second side of the lip 676. The second connectors 678 are configured to be received by the release bar opening 302 of the respective middle bracket 98 (FIG. 5A). The second connectors 678 may be configured to engage with the release bar opening 302 such that the coupling ring 670 is fixedly coupled to the respective middle bracket 98. It will be understood that the first connectors 674 may be fixedly coupled to the second bar 644 while the second connectors 678 are rotatably coupled to the middle bracket 98 without departing from the scope of the present disclosure.

The track release lever 18 extends from the second bar 644. In some examples, the track release lever 18 may be located on one end of the second bar 644. In other examples, the track release lever 18 may be located on each side of the second bar 644. The track release lever 18 may be integrally formed with the second bar 644 or may be welded or otherwise coupled to the second bar 644. According to various examples, the track release lever 18 may be spring loaded by a spring 684 positioned on the respective end portion 654 of the second bar 644 proximate the track release lever 18.

The track release lever 18 may be selective engageable with a release button assembly 688 positioned on the respective slide 68 of the track 14 of the track assembly 56. The release button assembly 688 may include a locking feature 690 for the respective slide 68. A release button 694 may extend upward from the release button assembly 688 and may be positioned proximate the track release lever 18.

Figure 12:
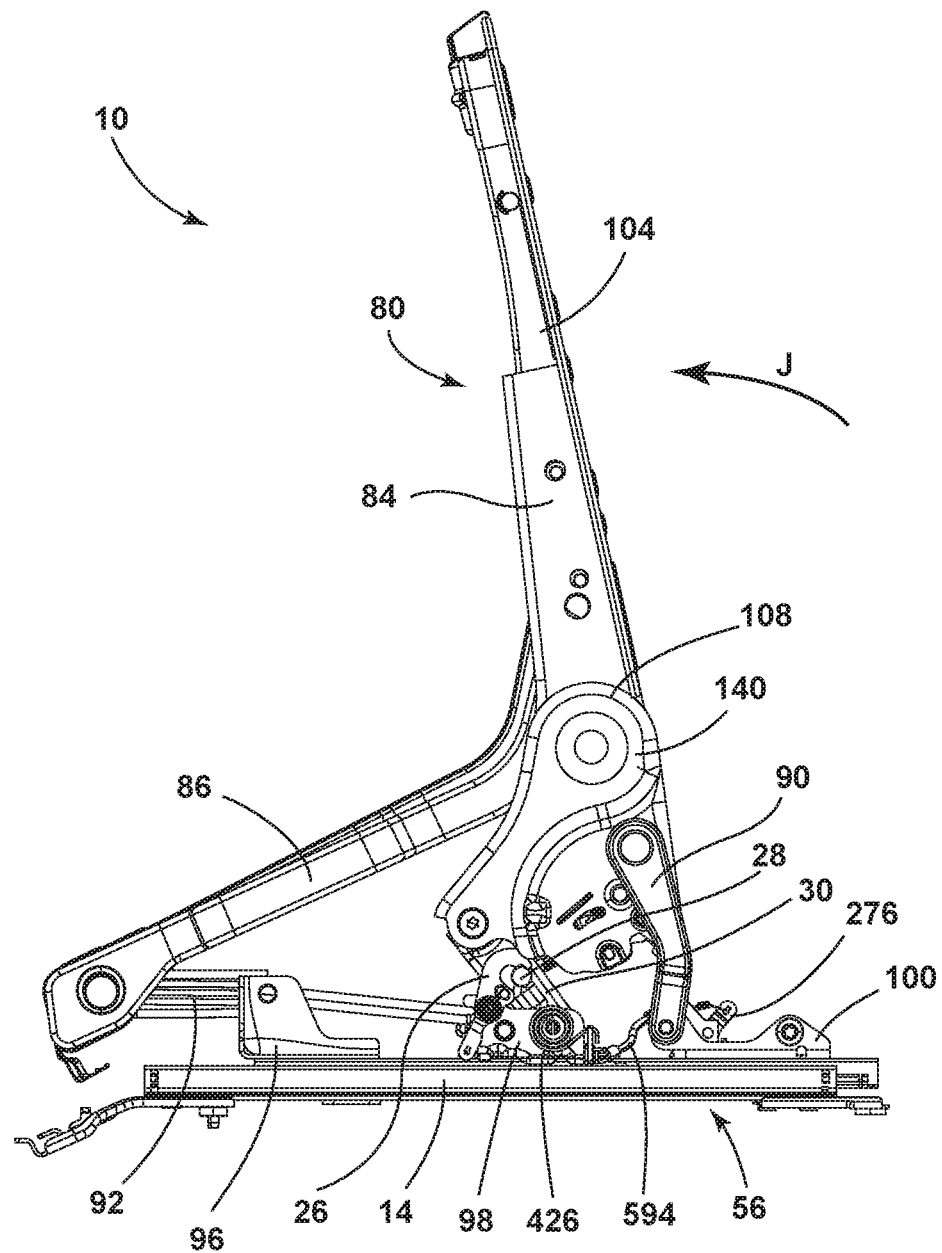
FIG. 12 is a side profile view of the frame of FIG. 2 in a pitched position.
Figure 13A:
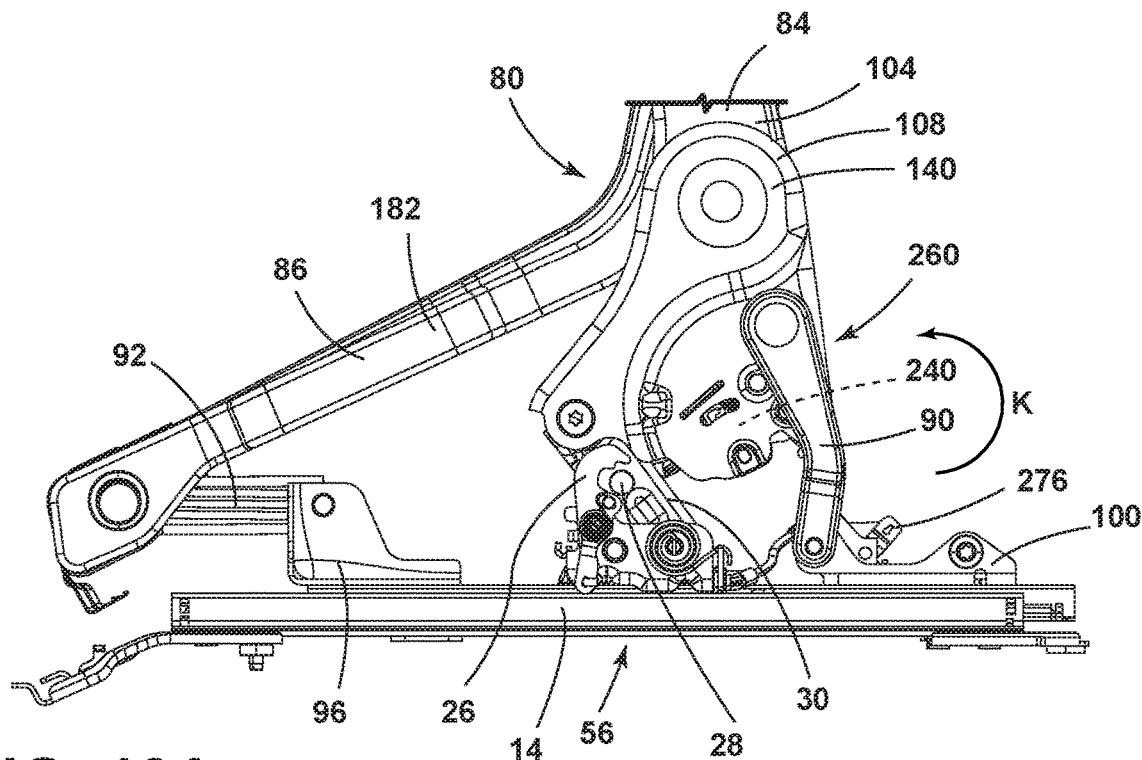
FIG. 13A is a first side profile view of the frame of FIG. 2 in a pitched position.
Figure 13B:
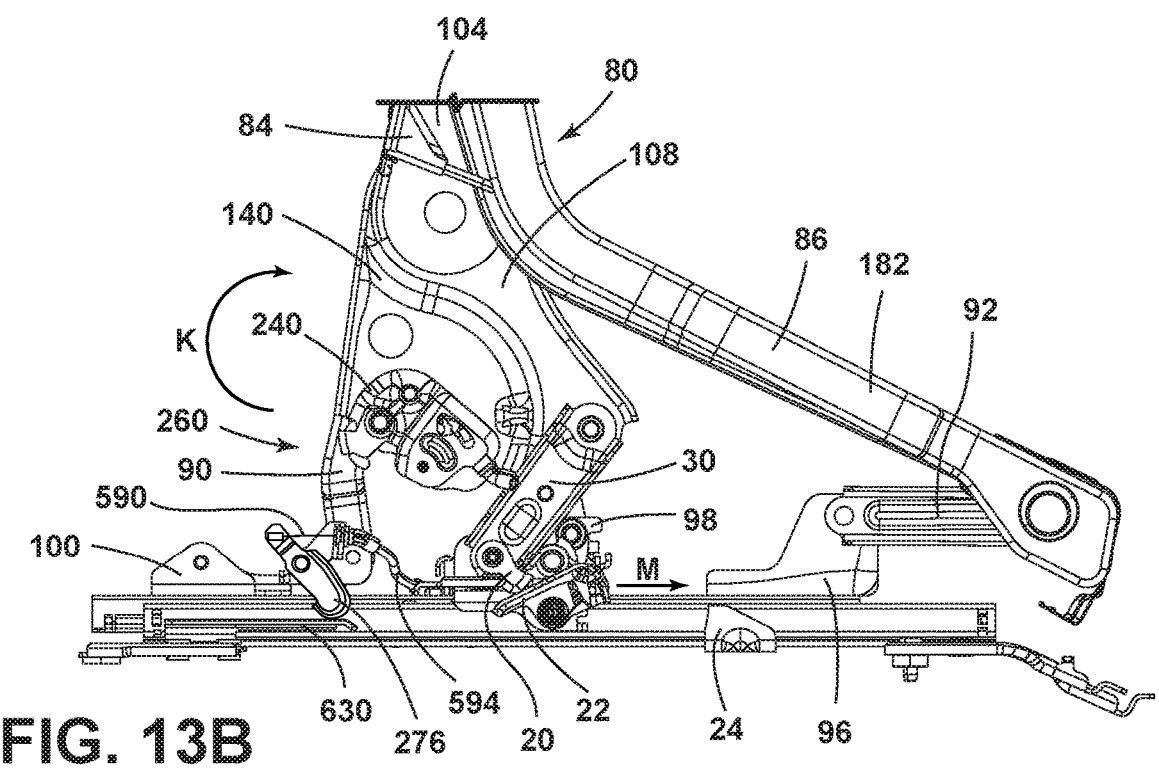
FIG. 13B is a second side profile view of the frame of FIG. 2 in a pitched position.
Figure 14A:
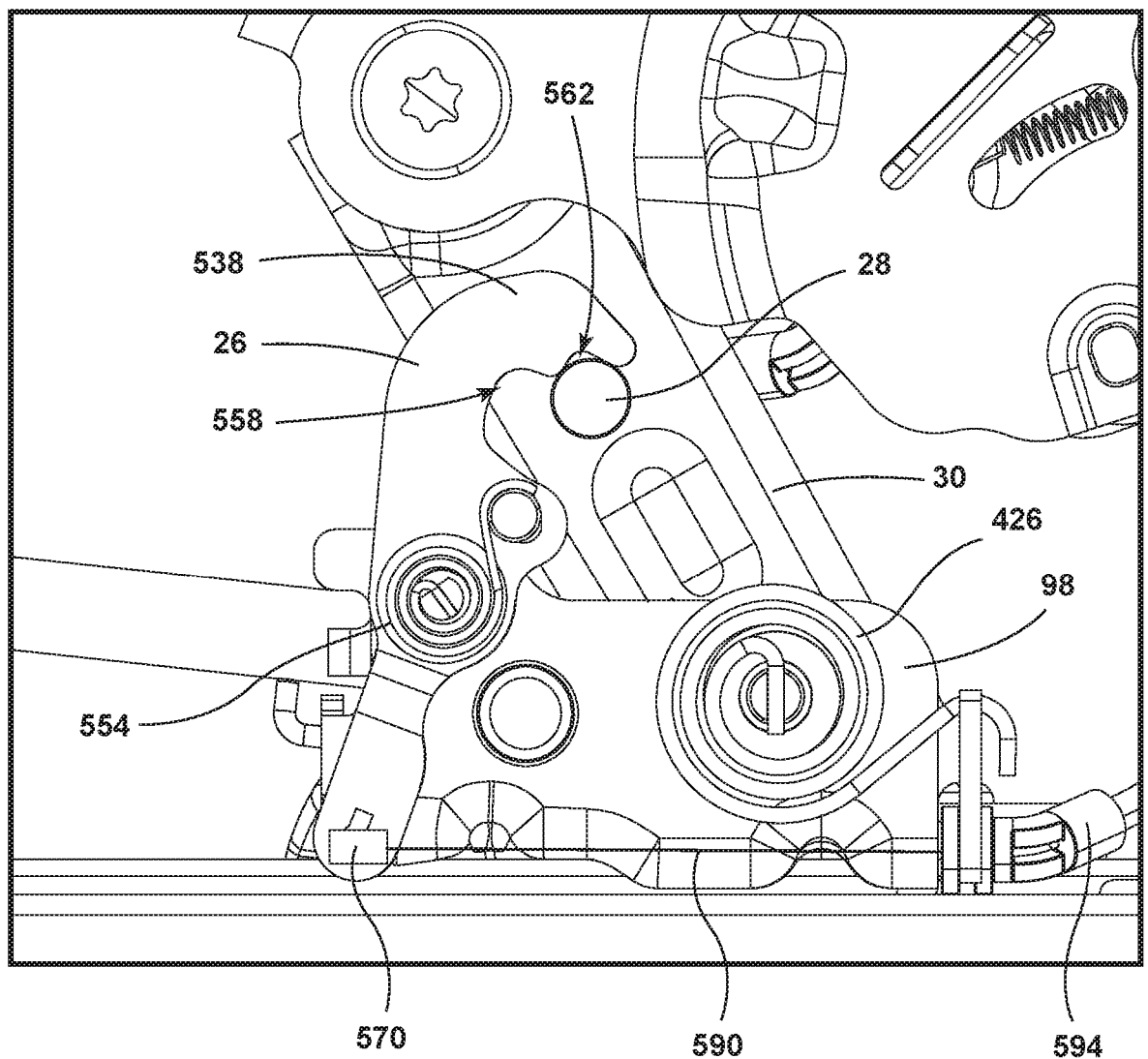
FIG. 14A is an enlarged side profile view of an intermediate lock of the pitching assembly of FIG. 13B in a first position.
Figure 14B:
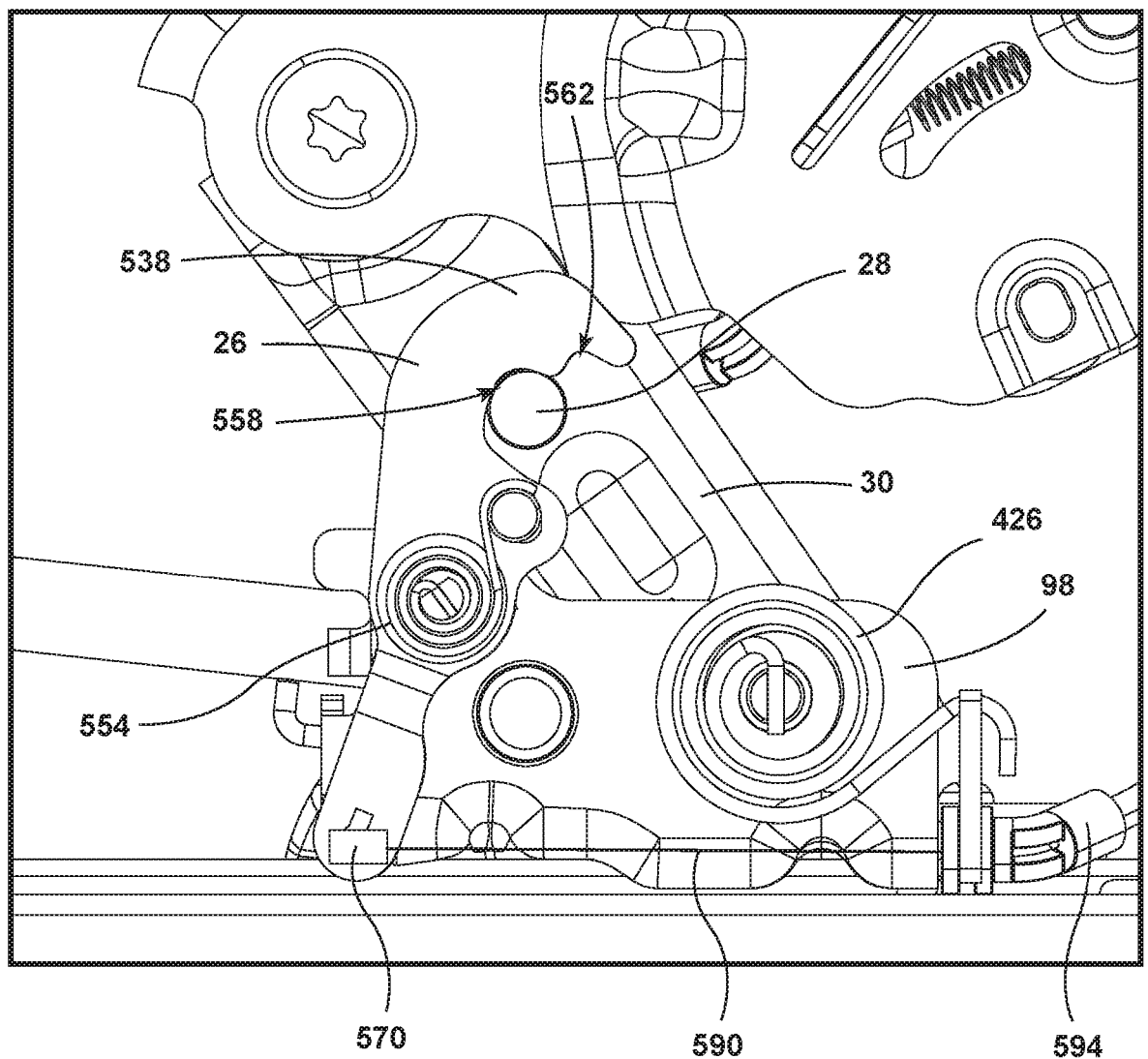
FIG. 14B is an enlarged side profile view of an intermediate lock of the pitching assembly of FIG. 13B in a second position.
Figure 15A:
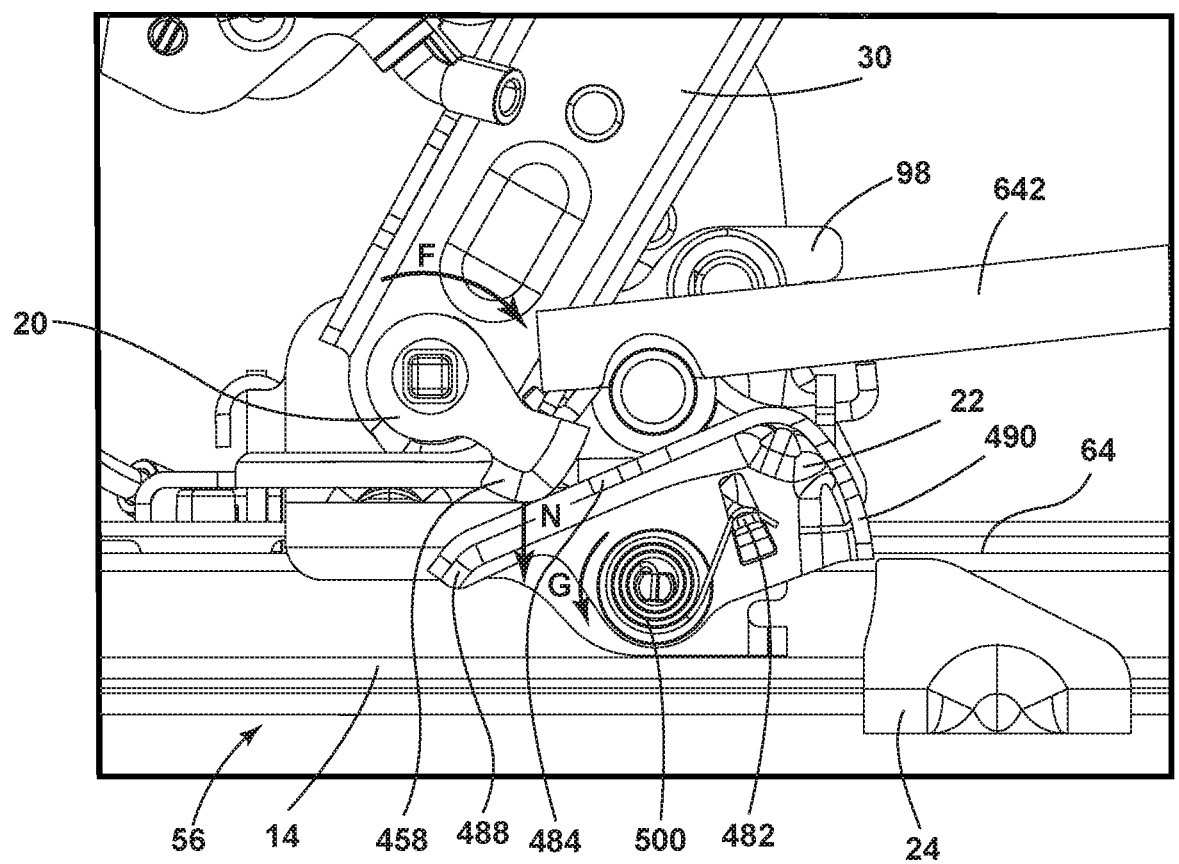
FIG. 15A is an enlarged side profile view of a track assembly and the pitching assembly of FIG. 13B with a cam in a raised position.
Figure 15B:
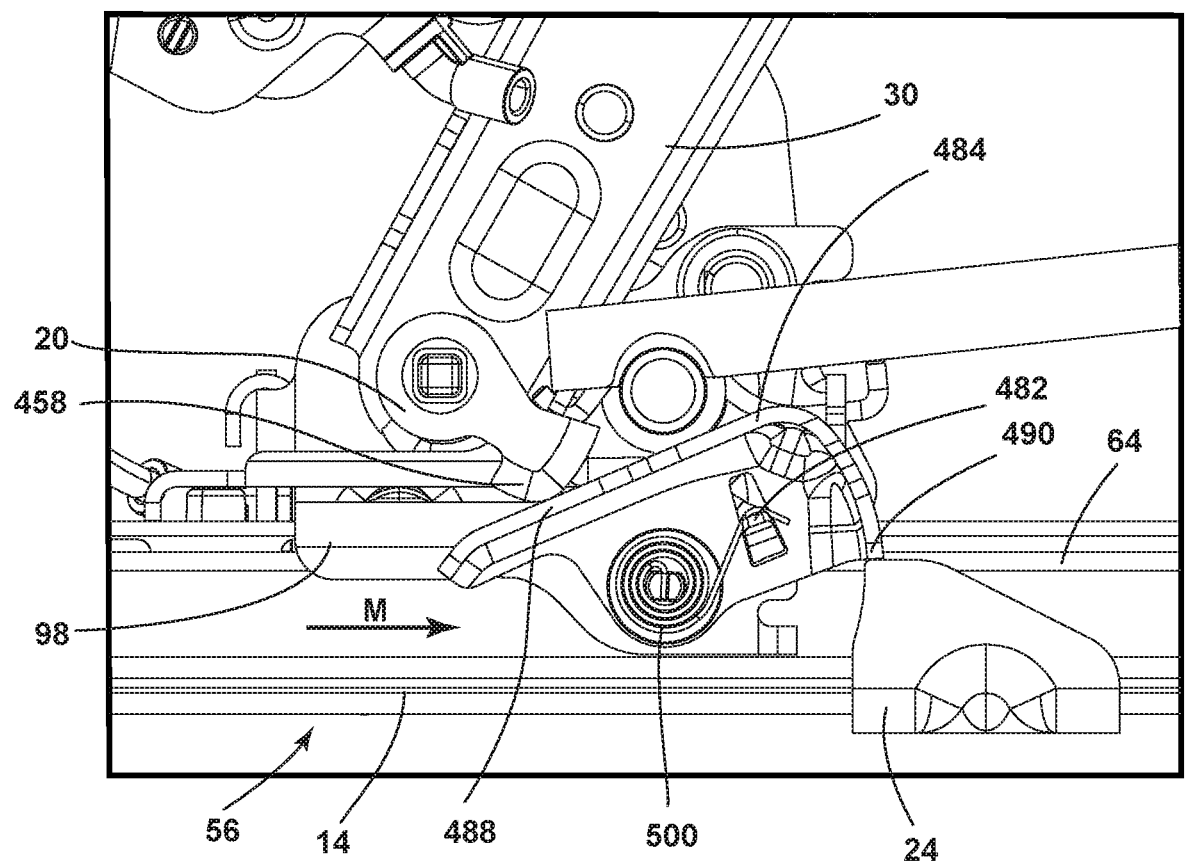
FIG. 15B is an enlarged side profile view of a track assembly and the pitching assembly of FIG. 13B with a cam in a raised position over a stop.

Referring now to FIGS. 10-13B, the pitch assembly 260 begins moving when the latch assembly 240 is released by the actuator member 130 (FIG. 2). When the latch assembly 240 is released, the seating assembly 10 may be pitched forward along a path indicated by arrow J (FIG. 12). As the seating assembly 10 is moved forward, the middle support arm 30 and the rear support arm 90 rotate along paths indicated by arrows A and B, respectively.

As the middle support arm 30 pivots along the path indicated by arrow A, the pivot pin 390 is rotated along a path indicated by arrow C. This rotation is translated through the first end portion 398 of the pivot pin 390 to the cross-member 268. As the cross-member 268 rotates with the pivot pin 390 into an engaged position, the first and second cams 16, 20 are subsequently rotated along paths indicated by arrows D and F into engaged positions, respectively. The rotation of the cross-member 268 and the first and second cams 16, 20 into engaged positions is against the bias of the clock spring 426. As the first cam 16 rotates along arrow D into the engaged position, the foot 448 of the first cam 16 depresses the track release lever 18. As the track release lever 18 is lowered along arrow E, the release button 694 positioned beneath the track release lever 18 is pressed downward by the track release lever 18. In some examples, the track release lever 18 may be depressed using the release bar 640. When the release bar 640 is raised (FIG. 17B), the second bar 644 is rotated along arrow H, causing the track release lever 18 to depress the release button 694.

As the second cam 20 rotates along arrow F into the engaged position, the first end 488 of upper rim 484 of the bypass cam 22 is also depressed. The bypass cam 22 subsequently rotates along a path indicated by arrow G, against the bias of the bypass clock spring 500. This provides space for movement along the track assembly 56, as discussed elsewhere herein.

Referring now to FIGS. 10 and 12-14B, as the middle support arm 30 rotates along arrow A, the pin 28 is also rotated toward the intermediate lock 26. When the seating assembly 10 is in the pitched position, the pin 28 is rotated into engagement with the second notch 562 of the hook 538 of the intermediate lock 26. Tension on the cable 590 from the trigger cam 276 holds the intermediate lock 26 in the first position to prevent the pin 28 from engaging with the first notch 558 of the hook 538. When the tension on the cable 590 is released by the trigger cam 276, as discussed in further detail elsewhere herein, the intermediate lock 26 is biased into a second position by the lock clock spring 554. This allows the pin 28 to move into the first notch 558 of the hook 538 of the intermediate lock 26. This engagement prevents inadvertent release of the pitched position of the seating assembly 10 and is only released when the trigger cam 276 places tension back on the cable 590, moving the intermediate lock 26 back into the first position against the bias of the lock clock spring 554. In other words, tension on the cable 590 biases the intermediate lock 26 in the first position against the bias of the clock spring 554.

Referring now to FIGS. 12-13B, 15A, and 15B, when the second cam 20 is rotated along arrow F into the engaged position, the foot 458 of the second cam 20 depresses the first end 488 of upper rim 484 of the bypass cam 22. This moves the first end 488 of the upper rim 484 of the bypass cam 22 along arrow N as the bypass cam 22 rotates along arrow G and against the bias of bypass clock spring 500. This results in the second end 490 of upper rim 484 of the bypass cam 22 to raise in a direction opposite arrow N into a raised position. In other words, the bypass cam 22 is movable into a raised position by the second cam 20 in the engaged position. The stop 24 positioned forward of the bypass cam 22 on the track assembly 56 has a first height. The second end 490 of upper rim 484 of the bypass cam 22 is positioned at a second height when the bypass cam 22 is in the raised position. The second height of the bypass cam 22 is greater than the first height of the stop 24. Thus, the bypass cam 22 is movable over the stop 24. This allows the respective slide 68 to move forward along the respective track 14 as indicated by arrow M without being limited in movement by the bypass cam 22 abutting the stop 24.

Figure 16:
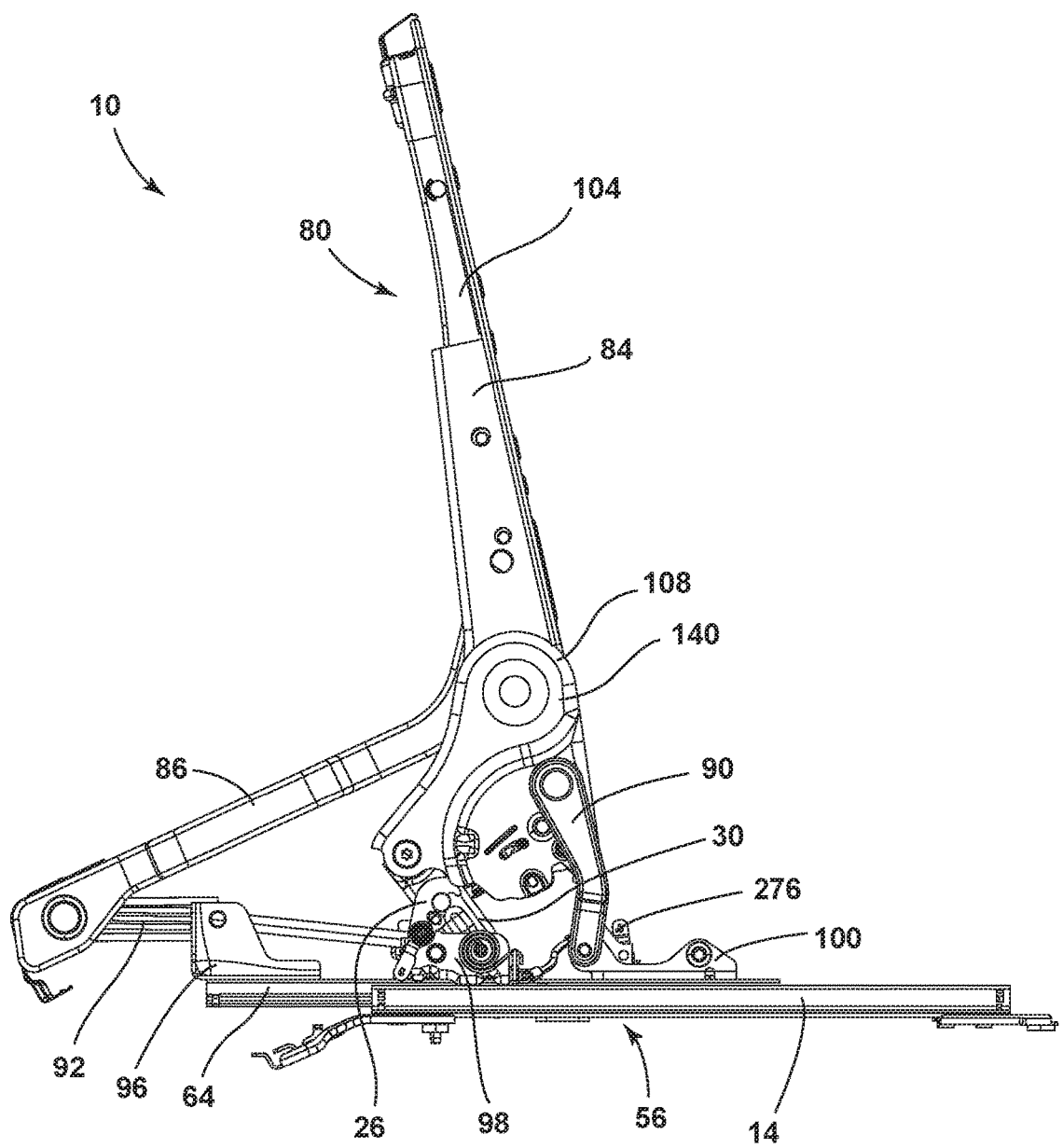
FIG. 16 is a side profile view of the frame of FIG. 2 in a pitched position and moved forward on a track.
Figure 17A:
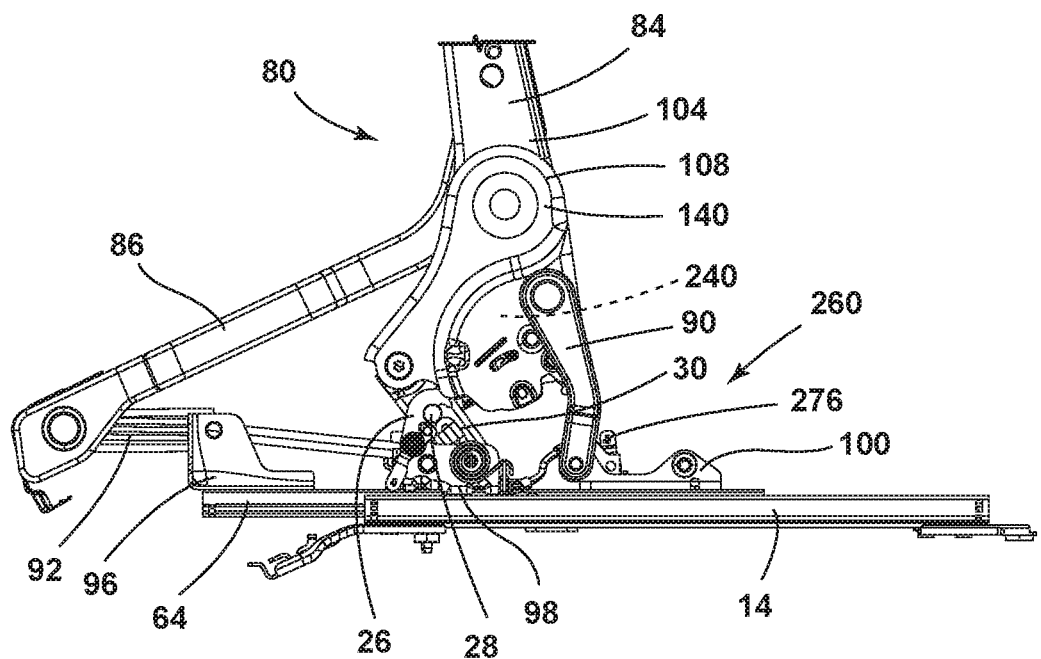
FIG. 17A is an enlarged first side profile view of a pitching assembly of the frame of FIG. 2 in a pitched position and moved forward on a track.
Figure 17B:
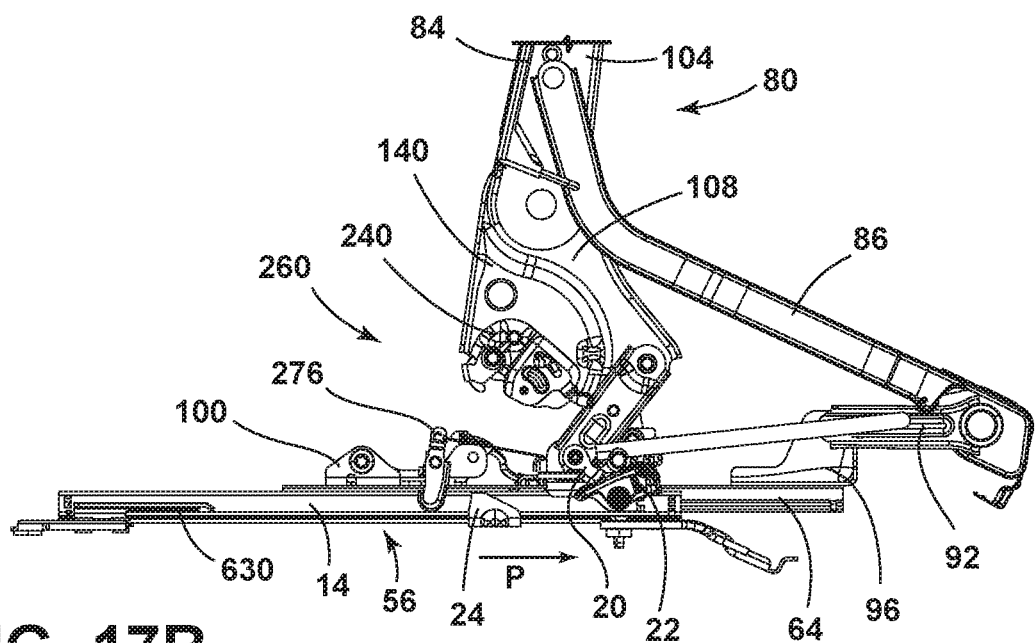
FIG. 17B is an enlarged second side profile view of a pitching assembly of the frame of FIG. 2 in a pitched position and moved forward on a track.

Referring now to FIGS. 14B and 16-17B, when the seating assembly 10 is in the pitched position, force may be applied to slide the seating assembly 10 forward along the track assembly 56 along arrows M and P. When the bypass cam 22 is in the raised position, the seating assembly 10 is movable into a forward position (FIG. 16). As the seating assembly 10 moves along arrow P into the forward position, the trigger cam 276 is moved off of the ramp 630. When the trigger cam 276 is moved off of the ramp 630, the trigger cam 276 is no longer held in position by the ramp 630 and the tension is released from the cable 590. When the tension is released from the cable 590, the intermediate lock 26 is biased into the second position by the lock clock spring 554, allowing the pin 28 to be received by the first notch 558 of the hook 538 of the intermediate lock 26. The pin 28 is configured to be released from engagement with the intermediate lock 26 only when the seating assembly 10 is returned to the pitched position and the trigger cam 276 is supported by the ramp 630. The intermediate lock 26 is then biased back into the first position by the tension on the cable 590 and the pin 28 may be removed from the 588 of the hook 538 to allow the seating assembly 10 to be moved back into the design position.

It will be understood by one having ordinary skill in the art that construction of the described concepts, and other components, is not limited to any specific material. Other exemplary embodiments of the concepts disclosed herein may be formed from a wide variety of materials unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A seating assembly comprising:
   a seatback coupled to a seat base, the seatback movable between a design position and a pitched position;
   a track assembly having a stop with a first height and a ramp configured to support a trigger cam when the seatback is in the design position;
   a cross-member rotatable into an engaged position and having a first portion and a second portion, wherein a first cam is positioned on the first portion and a second cam is positioned on the second portion;
   a track release lever engageable with a release button when the track release lever is depressed by the first cam in the engaged position;
   a bypass cam movable into a raised position by the second cam in the engaged position, a first end of the bypass cam positioned at a second height in the raised position, the second height being greater than the first height of the stop; and
   an intermediate lock having a first notch and a second notch, wherein a pin positioned on a support arm is selectively engageable with one of the first notch and the second notch when the seatback is in the pitched position.

2. The seating assembly of claim 1, wherein the intermediate lock is rotatable between a first position and a second position, and further wherein the pin is received by the first notch when the intermediate lock is in the first position and the pin is received by the second notch when the intermediate lock is in the second position.

3. The seating assembly of claim 2, wherein the trigger cam is operably coupled to the intermediate lock by a cable, and further wherein the intermediate lock is in the first position when the trigger cam is supported on the ramp and in the second position when the trigger cam is removed from the ramp.

4. The seating assembly of claim 3, wherein the intermediate lock is biased in the second position by a clock spring, and further wherein tension on the cable biases the intermediate lock in the first position against the bias of the clock spring.

5. A seating assembly comprising:
   a seatback coupled to a seat base, the seat base and the seatback movable between first and second positions by way of first, second, and third support arms and a track assembly;
   an actuator positioned on the seatback and operably coupled to a latch assembly positioned on the first support arm;
   a first cam and a second cam positioned on a cross-member and rotatable into an engaged position, the cross-member coupled to and rotatable with the second support arm;
   a track release lever engageable with a release button of the track assembly when the first cam is in the engaged position;
   a bypass cam rotated into a raised position by the second cam when the second cam is in the engaged position; and
   an intermediate lock defining a first notch and a second notch, wherein a stop of the second arm is selectively engageable with one of the first and second notches.

6. The seating assembly of claim 5, wherein a first portion of the cross-member includes a linear edge, and further wherein the first portion of the cross-member is positioned over a pin rotatably coupled to the second support arm and shaped to complement the cross-member.

7. The seating assembly of claim 6, further comprising:
   a bracket positioned on the track assembly and having an outer wall, the outer wall defining an aperture to at least partially receive the pin; and
   a first clock spring positioned to bias the cross-member and the second support arm into a disengaged position, wherein the first clock spring is positioned on a first side of the outer wall, and further wherein the second support arm and the cross-member are positioned on a second side of the outer wall.

8. The seating assembly of claim 5, further comprising: a stop is positioned on the track assembly, wherein the stop has a first height and is configured to abut the bypass cam when the seat base and the seatback are in the first position.

9. The seating assembly of claim 8, wherein the bypass cam is rotatable between the raised position and a lowered position, and further wherein a first end of the bypass cam is depressed by the second cam when the second cam is in the engaged position.

10. The seating assembly of claim 9, wherein a second end of the bypass cam is raised to a second height when the bypass cam is in the raised position, the second height being greater than the first height of the stop, and further wherein a second clock spring biases the bypass cam into the lowered position.

11. A seating assembly comprising:
a seatback movable into a pitched position along a track;
a first cam engageable with a release lever of the track;
a second cam engageable with a bypass cam that is raised over a stop as the seatback moves to the pitched position;
a cross-member, wherein the first and second cams are operably coupled to the cross-member, and further wherein the cross-member and the first and second cams are movable between an engaged position and a disengaged position; and
an intermediate lock engageable with a pin positioned on a middle support arm of a seat base when the seatback is in the pitched position.

12. The seating assembly of claim 11, wherein the seat base is pivotally coupled to the seatback, and further wherein the seatback includes a first portion and a second portion, the second portion having a generally triangular shape.

13. The seating assembly of claim 12, further comprising:
a rear support arm, wherein the rear support arm and the middle support arm are coupled to the second portion of the seatback;
a latch assembly coupled to the second portion of the seatback, the latch assembly selectively engageable with a striker positioned on a slide received by the track, wherein the latch assembly is coupled to the striker when the seatback is in a design position; and
an actuator positioned on the seatback, wherein the actuator is operably coupled to the latch assembly and configured to release the latch assembly from the striker, and further wherein the seat base is movable to the pitched position when the latch assembly is released.

14. The seating assembly of claim 11, further comprising:
a bracket positioned on a slide received by the track and having an outer wall, wherein the outer wall defines an aperture; and
a pin received by the aperture, wherein the pin includes a body portion, a first end, and a second end, and further wherein the first end has a linear edge and is coupled with the cross-member and the second end has a slot coupled with a clock spring.

15. The seating assembly of claim 11, further comprising:
a release button positioned beneath the release lever, wherein the release button is depressed by the release lever when the first cam engages with the release lever.

16. The seating assembly of claim 11, further comprising:
a release bar having a first bar and a second bar, wherein the first bar forms a handle extending from beneath the seat base, and further wherein the second bar is coupled to the release lever and is configured to depress the release lever when rotated by the first bar.

17. The seating assembly of claim 11, wherein the intermediate lock includes a hook, the hook defining a first notch and a second notch, the second notch positioned between the first notch and an end of the hook.

18. The seating assembly of claim 17, further comprising:
a trigger cam positioned on a ramp of the track, the trigger cam operably coupled to the intermediate lock.

19. The seating assembly of claim 18, wherein the pin is selectively engageable with the second notch when the trigger cam is positioned on the ramp, and further wherein the pin is selectively engageable with the first notch when the trigger cam is removed from the ramp.

* * * * *